US 6,976,093 B2
Dec. 13, 2005

(12) United States Patent
Lara et al.

(54) WEB SERVER CONTENT REPLICATION

(75) Inventors: Marco Lara, Topsfield, MA (US); Stanley Yamane, Framingham, MA (US); Jason DeBettencourt, Framingham, MA (US)

(73) Assignee: Yahoo! Inc., Sunnyvale, CA (US)

(*) Notice: Subject to any disclaimer, the term of this patent is extended or adjusted under 35 U.S.C. 154(b) by 0 days.

(21) Appl. No.: 09/377,611

(22) Filed: Aug. 19, 1999

(65) Prior Publication Data

US 2003/0041094 A1 Feb. 27, 2003

Related U.S. Application Data

(63) Continuation-in-part of application No. 09/086,821, filed on May 29, 1998, and a continuation-in-part of application No. 09/086,836, filed on May 29, 1998, now Pat. No. 6,317,786, and a continuation-in-part of application No. 09/086,874, filed on May 29, 1998, now Pat. No. 6,279,001, and a continuation-in-part of application No. 09/087,263, filed on May 29, 1998, now Pat. No. 6,314,463.

(60) Provisional application No. 60/117,674, filed on Jan. 28, 1999.

(51) Int. Cl.[7] .............................................. G06F 15/16
(52) U.S. Cl. ...................... 709/248; 709/202; 709/205; 707/201
(58) Field of Search ................................ 709/248, 202, 709/205, 200, 201, 226, 241, 223, 217, 221, 218, 246; 707/201, 8, 10

(56) References Cited

U.S. PATENT DOCUMENTS

| 4,750,135 A | 6/1988 | Boilen |
| 5,179,652 A | 1/1993 | Rozmanith et al. |
| 5,223,924 A | 6/1993 | Strubbe |
| 5,321,803 A | 6/1994 | Ditter, Jr. |
| 5,341,477 A | 8/1994 | Pitkin et al. ................. 395/200 |

(Continued)

FOREIGN PATENT DOCUMENTS

| GB | 2 327 783 A | 2/1999 | ........... G06F/9/445 |
| JP | 10224349 | 8/1998 | ........... H04L/12/24 |
| JP | 11238036 | 8/1999 | ........... G06F/15/00 |
| JP | 11327964 | 11/1999 | ........... G06F/11/34 |
| WO | WO 98/54631 | 12/1998 | |

OTHER PUBLICATIONS

BMC Software, Inc., http://www.bmc.com/, printed on Jul. 31, 1998, 43 pages.

(Continued)

*Primary Examiner*—Abdullahi E. Salad
(74) *Attorney, Agent, or Firm*—Duane Morris LLP

(57) ABSTRACT

This invention relates to managing multiple web servers, and more particularly to a web service system and method that allows a system operator to distribute content to each web server in the web service system. In one embodiment, a method for replicating changes in a source file set on a destination file system includes identifying changes in a source file set, storing the identified changes in a modification list, and transmitting the modification list to an agent having access to a destination file system. In another embodiment, a method for replicating changes in a source file set on a destination file system includes identifying changes in a source file set, storing the identified changes in a modification list, and transmitting the modification list to a plurality of web servers. In another embodiment, a web service system includes a manager for managing the web service system, a host comprising a web server for receiving web page requests and an agent in communication with the manager, and a content distributor for providing content changes to the host. In another embodiment, a content distributor includes an identification module for identifying changes in a source file set, a modification list for storing identified changes, and a transmitter for transmitting the modification list to an agent having access to a destination file system.

25 Claims, 13 Drawing Sheets

U.S. PATENT DOCUMENTS

| | | | |
|---|---|---|---|
| 5,367,698 A | | 11/1994 | Webber et al. |
| 5,418,945 A | * | 5/1995 | Carter et al. ............... 707/8 |
| 5,434,994 A | | 7/1995 | Shaheen et al. |
| 5,440,739 A | | 8/1995 | Beck et al. ............... 395/650 |
| 5,459,837 A | | 10/1995 | Caccavale ............... 709/226 |
| 5,475,813 A | | 12/1995 | Cieslak et al. ......... 395/182.02 |
| 5,586,322 A | | 12/1996 | Beck et al. ............... 395/616 |
| 5,611,049 A | | 3/1997 | Pitts ............... 395/200.09 |
| 5,613,155 A | | 3/1997 | Baldiga et al. ............... 710/5 |
| 5,617,540 A | | 4/1997 | Civanlar et al. |
| 5,623,652 A | | 4/1997 | Vora et al. |
| 5,630,116 A | | 5/1997 | Takava et al. |
| 5,655,081 A | | 8/1997 | Bonnell et al. ............... 709/202 |
| 5,664,111 A | | 9/1997 | Nahan et al. |
| 5,675,784 A | | 10/1997 | Maxwell et al. |
| 5,682,525 A | | 10/1997 | Bouve et al. |
| 5,689,642 A | | 11/1997 | Harkins et al. |
| 5,694,546 A | | 12/1997 | Reisman |
| 5,696,963 A | | 12/1997 | Ahn |
| 5,708,780 A | | 1/1998 | Levergood et al. |
| 5,715,443 A | | 2/1998 | Yanagihara et al. |
| 5,715,453 A | | 2/1998 | Stewart ............... 395/615 |
| 5,717,860 A | | 2/1998 | Graber et al. |
| 5,724,567 A | | 3/1998 | Rose et al. |
| 5,729,735 A | * | 3/1998 | Meyering ............... 707/10 |
| 5,742,768 A | | 4/1998 | Gennaro et al. ......... 295/200.33 |
| 5,758,257 A | | 5/1998 | Herz et al. |
| 5,761,507 A | | 6/1998 | Govett ............... 395/684 |
| 5,765,171 A | | 6/1998 | Gehani et al. |
| 5,774,660 A | | 6/1998 | Brendel et al. ............... 709/200 |
| 5,774,668 A | | 6/1998 | Choquier et al. ............ 709/223 |
| 5,777,989 A | | 7/1998 | McGarvey |
| 5,781,449 A | | 7/1998 | Rosborough ............... 709/224 |
| 5,812,793 A | | 9/1998 | Shakib et al. ............... 709/201 |
| 5,819,284 A | | 10/1998 | Farber et al. |
| 5,832,511 A | | 11/1998 | Beck et al. ............... 707/201 |
| 5,848,270 A | | 12/1998 | DeLuca et al. ............... 395/675 |
| 5,862,335 A | | 1/1999 | Welch, Jr. et al. |
| 5,867,706 A | | 2/1999 | Martin et al. ............... 395/675 |
| 5,870,559 A | | 2/1999 | Leshem et al. ......... 395/200.54 |
| 5,881,238 A | | 3/1999 | Aman et al. ............ 395/200.56 |
| 5,884,324 A | | 3/1999 | Cheng et al. ............... 707/201 |
| 5,892,908 A | | 4/1999 | Hughes et al. |
| 5,892,914 A | | 4/1999 | Pitts ............... 395/200.49 |
| 5,894,554 A | | 4/1999 | Lowery et al. ......... 395/200.33 |
| 5,903,757 A | | 5/1999 | Gretz et al. ............... 395/704 |
| 5,917,491 A | | 6/1999 | Bauersfeld ............... 345/352 |
| 5,924,096 A | | 7/1999 | Draper et al. |
| 5,933,490 A | | 8/1999 | White et al. ............... 379/221 |
| 5,933,596 A | | 8/1999 | Mayhew ............... 395/200.33 |
| 5,933,606 A | | 8/1999 | Mayhew ............... 395/200.69 |
| 5,940,594 A | | 8/1999 | Ali et al. ............... 395/200.33 |
| 5,951,643 A | | 9/1999 | Shelton et al. ............... 709/227 |
| 5,951,694 A | | 9/1999 | Choquier et al. |
| 5,954,798 A | | 9/1999 | Shelton et al. ............... 709/224 |
| 5,956,716 A | | 9/1999 | Kenner et al. ............... 707/10 |
| 5,958,008 A | | 9/1999 | Pogrebisky et al. ......... 709/223 |
| 5,958,016 A | | 9/1999 | Chang et al. ............... 709/229 |
| 5,964,836 A | | 10/1999 | Rowe et al. ............... 709/221 |
| 5,974,441 A | | 10/1999 | Rogers et al. ............... 709/200 |
| 5,974,462 A | | 10/1999 | Aman et al. ............... 709/225 |
| 5,974,572 A | | 10/1999 | Weinberg et al. ............... 714/47 |
| 5,978,802 A | | 11/1999 | Hurvig |
| 5,978,805 A | | 11/1999 | Carson |
| 5,987,476 A | | 11/1999 | Imai et al. |
| 5,987,523 A | | 11/1999 | Hind et al. |
| 5,991,798 A | | 11/1999 | Ozaki et al. |
| 5,999,930 A | | 12/1999 | Wolff |
| 6,006,260 A | | 12/1999 | Barrick, Jr. et al. ......... 709/224 |
| 6,006,264 A | | 12/1999 | Colby et al. ............... 709/226 |
| 6,009,102 A | | 12/1999 | Horikawa et al. |
| 6,014,137 A | | 1/2000 | Burns |
| 6,014,437 A | | 1/2000 | Acker et al. ............... 379/219 |
| 6,016,496 A | | 1/2000 | Roberson |
| 6,016,504 A | | 1/2000 | Arnold et al. ............... 709/200 |
| 6,021,439 A | | 2/2000 | Turek et al. ............... 709/224 |
| 6,023,722 A | | 2/2000 | Colyer ............... 709/201 |
| 6,026,414 A | | 2/2000 | Anglin ............... 707/204 |
| 6,026,452 A | | 2/2000 | Pitts ............... 710/56 |
| 6,029,175 A | | 2/2000 | Chow et al. |
| 6,035,323 A | | 3/2000 | Narayan et al. ............ 709/201 |
| 6,035,332 A | | 3/2000 | Ingrassia, Jr. et al. ...... 709/224 |
| 6,037,935 A | | 3/2000 | Bates et al. ............... 345/335 |
| 6,041,041 A | | 3/2000 | Ramanathan et al. ....... 370/241 |
| 6,044,381 A | | 3/2000 | Boothby et al. |
| 6,052,718 A | | 4/2000 | Gifford ............... 709/219 |
| 6,061,683 A | * | 5/2000 | Alonso ............... 707/8 |
| 6,061,740 A | | 5/2000 | Ferguson et al. ............ 709/246 |
| 6,070,191 A | | 5/2000 | Narendran et al. ......... 709/226 |
| 6,085,234 A | | 7/2000 | Pitts et al. ............... 709/217 |
| 6,088,721 A | | 7/2000 | Lin et al. |
| 6,094,659 A | | 7/2000 | Bhatia ............... 707/104 |
| 6,098,093 A | | 8/2000 | Bayeh et al. ............... 709/203 |
| 6,101,508 A | | 8/2000 | Wolff ............... 707/218 |
| 6,108,300 A | | 8/2000 | Coile et al. |
| 6,112,239 A | | 8/2000 | Kenner et al. |
| 6,122,658 A | | 9/2000 | Chaddha ............... 709/203 |
| 6,128,279 A | | 10/2000 | O'Neil et al. |
| 6,138,162 A | | 10/2000 | Pistriotto et al. |
| 6,148,335 A | | 11/2000 | Haggard et al. |
| 6,167,567 A | | 12/2000 | Chiles et al. |
| 6,169,794 B1 | * | 1/2001 | Oshimi et al. ......... 379/221.09 |
| 6,173,322 B1 | | 1/2001 | Hu |
| 6,182,117 B1 | * | 1/2001 | Christie et al. ............... 709/205 |
| 6,182,139 B1 | | 1/2001 | Brendel |
| 6,185,601 B1 | | 2/2001 | Wolff |
| 6,189,043 B1 | | 2/2001 | Buyukkoc et al. ............ 709/241 |
| 6,202,085 B1 | | 3/2001 | Benson et al. ............... 709/205 |
| 6,223,187 B1 | | 4/2001 | Boothby et al. ............ 707/201 |
| 6,233,543 B1 | | 5/2001 | Butts et al. |
| 6,240,454 B1 | | 5/2001 | Nepustil |
| 6,243,715 B1 | * | 6/2001 | Bogantz et al. ............... 707/201 |
| 6,256,675 B1 | | 7/2001 | Rabinovich ............... 709/241 |
| 6,272,593 B1 | | 8/2001 | Dujari |
| 6,279,001 B1 | | 8/2001 | DeBettencourt et al. ...... 707/10 |
| 6,286,045 B1 | | 9/2001 | Griffiths et al. |
| 6,304,881 B1 | | 10/2001 | Halim et al. |
| 6,314,463 B1 | | 11/2001 | Abbott et al. |
| 6,317,754 B1 | | 11/2001 | Peng |
| 6,317,786 B1 | | 11/2001 | Yamane et al. |
| 6,330,568 B1 | | 12/2001 | Boothby et al. |
| 6,330,602 B1 | | 12/2001 | Law et al. |
| 6,339,785 B1 | | 1/2002 | Feigenbaum |
| 6,381,242 B1 | | 4/2002 | Maher, III et al. |
| 6,385,626 B1 | * | 5/2002 | Tamer et al. ............... 707/203 |
| 6,405,252 B1 | | 6/2002 | Gupta et al. |
| 6,424,966 B1 | | 7/2002 | Meyerzon et al. |
| 6,446,088 B1 | | 9/2002 | Vaduvur et al. |
| 6,460,036 B1 | | 10/2002 | Herz |
| 6,460,040 B1 | | 10/2002 | Burns |
| 6,477,522 B1 | | 11/2002 | Young |
| 6,484,204 B1 | * | 11/2002 | Rabinovich ............... 709/226 |
| 6,519,626 B1 | | 2/2003 | Soderberg et al. |
| 6,631,395 B1 | * | 10/2003 | Chessell ............... 718/101 |
| 6,654,891 B1 | | 11/2003 | Borsato et al. |
| 6,678,717 B1 | | 1/2004 | Schneider |

OTHER PUBLICATIONS

Bright Tiger Techologies, http://www.brighttiger.com/Default.htm, printed on Jul. 30, 1998, 63 pages.

"Intranet Load–Balancing Solutions," Infoworld, Mar. 23, 1998, vol. 20, Issue 12, http://www.infoworld.com/cgi–bin/displayArchive.pl?/98/12/intrsola.dat.htm, printed on Aug. 4, 1998, 28 pages.

Patrol Architecture—Raising the Application Management Standard, http://www.bmc.com/products/pat/amo/patw-p.html, printed on Jul. 27, 1998, 21 pages.

Resonate, Inc., http://www.resonate.com/, printed on Jul. 30, 1998, 31 pages.

Mason, R. "Atreve Announces WebSpective: The First Tool for Web Operations Management," International Data Corporation, 16 pgs., 1998.

Atreve Software, Inc. "Insuring Your Web Business for Online Success," Aug. 3, 1998, 2 pgs.

Atreve Software, Inc. "The Case for Web Operations Management," Aug. 3, 1998, 2 pgs.

Atreve Software, Inc. "WEBSPECTIVE™ Release 2," Aug. 3, 1998, 2 pgs.

Computerworld, "the buzz," pp. 6–9, Jul. 27, 1998, http://www.computerworld.com/home/emmerce.nsf/all/980727buzz.

Atreve Software, Inc. "The WebSpective Content Distributor," Jun. 1998, 9 pgs.

Press Release "Atreve Software Secures $8.6 Million in Second Round of Venture Financing," Jun. 29, 1998, 3 pgs.

Computerworld, "Atreve Software Has Introduced WebSpective Release 2," Jun. 15, 1998, 1 pg.

Babcock, C. "Atreve Eases Web App Management," Inter@ctive Week Online, Jun. 15, 1998, 2 pgs.

Babcock, C. "Atreve Eases Web App Management," Inter@ctive Week, Jun. 15, 1998, 1 pg.

Internet News.Com Online, "Atreve Delivers WebSpective Release 2," Jun. 10, 1998, 1 pg.

Internet World Online, "Atreve Upgrades WebSpective System," Jun. 10, 1998, 1 pg.

New Product News Online, "Atreve Introduces The Only Complete Solution For Web Operations Management," Jun. 8, 1998, 2 pgs.

Infoworld Electric Online, "Intranets & I–Commerce," Jun. 8, 1998, 1 pg.

Infoworld "Shipping," Jun. 8, 1998, 1 pg.

Internet World Products and Services, " Atreve Upgrades WebSpective System," Jun. 8, 1998, 1 pg.

Joachim, D. "Web Mgm't Tool Keeps Tabs On User Experience," Internet Week Online, Jun. 8, 1998, 1 pg.

Joachim, D. "Web Mgm't Tool Keeps Tabs On User Experience," Internet Week, Jun. 8, 1998, 1 pg.

Hannon, B. "Atreve Puts New WebSpective On Online Site Management," PC Week, Jun. 8, 1998, 1 pg.

Press Release "Atreve Introduces the Only Complete Solution for Web Operations Management–Webspective Release 2," Jun. 8, 1998, 3 pgs.

Press Release "Comprehensive Content Replication and Distribution Module Added to Atreve's Webspective Solution," Jun. 8, 1998, 3 pgs.

Joachim, D. "Atreve's Web Management Tool Keeps Tabs on User Experience," CMP.NET Online, Jun. 5, 1998, 2 pgs.

Hannon, B. "Atreve Puts New WebSpective On Online Site Management," PC Week Online, Jun. 5, 1998, 1 pg.

Husum, D. "Building on Experience: Atreve Positions Web Management Suite to Interupt Final Stage of Site Demise," Web Vantage Online, Jun. 5, 1998, 2 pgs.

Clark, T. "Atree updates site management," CNET NEWS. COM, Jun. 3, 1998, 1 pg.

Atreve Software, Inc. "Atreve WebSpective and Cisco Local Director," May 1998, 10 pgs.

Desmond, P. "Atreve to beef up Web management tool," Network World.Fusion, May 29, 1998, 2 pgs.

Atreve Software, Inc. "Managing a Successful Financial–Services Web Presence," Apr. 29, 1998, 2 pgs.

Press Release "Atreve's WEBSPECTIVE™ 1.5 Increases Performance and Availability of Commerce–Critical Web Sites," Apr. 27, 1998, 3 pgs.

Atreve Software, Inc. "Mission Control for Web Operations: A White Paper,", Apr. 15, 1998, 18 pgs.

Press Release "Atreve Software Names Doherty CFO," Apr. 13, 1998, 2 pgs.

Press Release "Atreve Software Incorporates RSA Encryption for SSL–Secure Web Application Solution," Mar. 17, 1998, 2 pgs.

Atreve Software, Inc. "The Case for Web Application Management, " Mar. 9, 1998, 2 pgs.

Freeman, E. "New tools help server farms blossom," Datamation, Feb. 1998, 5 pgs.

Delmonico, D. "Web–Site Management Tools: Big Market With Room For Growth," Internet Week, Feb. 23, 1998, 4 pgs.

Barnes, M. "e–Commerce Ready to Explode," Boston Software Newspaper, Jan. 1998, 2 pgs.

Network Magazine, "Web–Spective 1.5 Manages Web Server Loads," Network Magazine, Jan. 12, 1998, 1 pg.

Press Release "Atreve Software, Inc. Names Joe Debold Vice President of Sales," Jan. 6, 1998, 2 pgs.

Karpinski, R. "Net Marketing: Web Impact: New Load Balancers Can Help Your Site Serve More Customers," Business Marketing, Jan. 1, 1998, 2 pgs.

Bank Technology News, "Wall Street Highlights Problem Of Web Jams," Faulkner & Gray, Inc., Dec. 1997, 2 pgs.

Bank Technology News, "Wall Street Highlights Problem Of Web Jams," Bank Technology News, Dec. 1997, 2 pgs.

Computerworld, "News Products," Computerworld, Dec. 8, 1997, 1 pg.

LAN Times, "Inspecting Internet applications," LAN Times, Dec. 8, 1997, 1 pg.

Wallace et al. "Load balancers aid Web site access," Computerworld, Dec. 1, 1997, 2 pgs.

Eddy, A. "Atreve software to lighten Web management load," Network World, Nov. 24, 1997, 2 pgs.

Wilson, T. "Atreve Sees New Perspective," Internet Week, Nov. 24, 1997, 1 pg.

Wilson, T. "Scrutinizing Web Performance," Internet Week, Nov. 17, 1997, 2 pgs.

Wilson, T. "Scrutinizing Web Performance Increased Internet—Traffic Problematic When There's No Time to Plan," Internet Week Online, Nov. 17, 1997, 2 pgs.

Wilson, T. "Wall Street Frenzy Leaves Website Managers; Taking Stock," Internet Week Online, Nov. 13, 1997, 2 pgs.

Degnan, C. "Atreve shakes out the cobwebs," Mass. High Tech, Nov. 7–13, 1997, 1 pg.

Petersen, S. "WebSpective Tightens The Reins on Web Apps," PC Week, Nov. 10, 1997, 1 pg.

Petersen, S. "WebSpective Tightens the Reins on Web Apps," PC Week Online, Nov. 10, 1997, 1 pg.

Press Release "Atreve Delivers WEBSPECTIVE™ 1.5, the Leading Solution for Managing Business–Critical Web Applications," Nov., 10, 1997, 3 pgs.

Aldrich, S. "Atreve Delivers Web Application Service Level Management," Internet Tools and Technologies Service—e–Bulletin, Nov. 3, 1997, 4 pgs.

Press Release "Atreve Software, Inc. Names Glenn D. House President and CEO," Sep. 29, 1997, 3 pgs.

Wilson, T. "Managing Access To E–Commerce Sites," Internet Week, Sep. 1, 1997, 3 pgs.

Atreve Software, Inc. "WebSpective LA Installation and User's Guide," Jul. 16, 1997, 72 pgs.

Atreve Software, Inc. "Interceptor 1.0 Installation and User's Guide," Jul. 16, 1997, 36 pgs.

Rodriguez, K. "Atreve Provides Multiserver Web Management," Inter@ctive Week, Jul. 21, 1997, 1 pg.

LAN Times, "A certain level of service," LAN Times Online, Jul. 21, 1997, 1 pg.

Kerstetter et al. "Raising Web Analysis Bar," PC Week, Jun. 30, 1997, 2 pgs.

Kerstetter et al. "Raising Web Analysis Bar," PCWeek Online, Jun. 27, 1997, 2 pgs.

Atreve Software, Inc. "Web Application Management: Quality of Service is Job One," Jun. 24, 1997, 11 pgs.

Wilder, C. "Atreve Beta Manages Web Apps—WebSpective aimed at high–volume sites," Information Week, Jun. 23, 1997, 1 pg.

Wilder, C. "Atreve Beta Manages Web Apps—WebSpective aimed at high–volume sites," Information Week Online, Jun. 23, 1997, 1 pg.

Cox, J. "Atreve relieves taxed Web sites," Network World, Jun. 23, 1997, 2 pgs.

Press Release "Atreve Software, Inc. Formed to Address Challenges Associated with Managing Business–Critical Web Applications," Jun. 23, 1997, 3 pgs.

Patent Cooperation Treaty, Written Opinion, International Application No. PCT/US00/01897, mailed on Oct. 25, 2000, 8 pages.

Patent Cooperation Treaty, Written Opinion, International Application No. PCT/US00/01837, mailed on Oct. 30, 2000, 9 pages.

Patent Cooperation Treaty, Notification of Transmittal of the International Search Report or the Declaration, International Application No. PCT/US00/42745, mailed on Oct. 23, 2001, 8 pages.

Beckett D., "Combined Log System", *Computer Networks and ISDN Systems, North Holland Publishing*, vol. 27, No. 11, Apr. 1, 1995, pp. 1089–1096.

Lamm S.E. et al.: "Real–Time Geographic Visualization of World Wide Web Traffic", *Computer Networks and ISDN Systems, North Holland Publishing*, vol. 28, No. 11, May 1, 1996, pp. 1457–1468.

Dias, D. et al. "A Scalable and Highly Available Web Server, " *Digest of Papers of the Computer society Computer Conference Compcon, IEEE Comp. Soc. Press,* vol. CONF>41, 1996, Los Alamitos, US, pp. 85–92.

Patent Cooperation Treaty, International Search Report, International Application No. PCT/US00/01837, mailed on May 29, 2000, 7 pages.

Patent Cooperation Treaty, International Search Report, International Application No. PCT/US00/01897, mailed on May 29, 2000, 7 pages.

* cited by examiner

| | |
|---|---|
| aaa/ | (being created) |
| aaa/agent.reg | (being created) |
| aaa/questd.reg | (being created) |
| aaa/sqlserver.reg | (being created) |
| bbb/ | (being created) |
| ccc/ | (being created) |
| ddd/abc/ | (unchanged) |
| ddd/efg/ | (unchanged) |
| efg/ | (unchanged) |
| mmm/ | (being deleted) |
| xxx/ | (being deleted) |
| xxx/agent.reg | (being deleted) |
| xxx/questd.reg | (being deleted) |
| xxx/sqlserver.reg | (being deleted) |
| yyy/ | (being deleted) |

| | 301 | 302 | 303 | 304 | 305 | 306 | 307 | 308 |
|---|---|---|---|---|---|---|---|---|
| ELEMENT 1 | DIR | ADD | drwx------ | 0 | May 27 17:12 | uid[000000,000000] | crc(0000000000) | aaa |
| | NRM | ADD | -rw------- | 569 | May 11 1998 | uid[000000,000000] | crc(3564886220) | agent.reg |
| | NRM | ADD | -rw------- | 287 | Apr 22 14:47 | uid[000000,000000] | crc(2653417408) | questd.reg |
| | NRM | ADD | -rw------- | 251 | Feb 11 16:54 | uid[000000,000000] | crc(683833640) | sqlserver.reg |
| | END | --- | ---------- | 0 | Dec 31 1969 | uid[000000,000000] | crc(0000000000) | <dirend> |
| ELEMENT 2 | DIR | ADD | drwx------ | 0 | May 27 17:15 | uid[000000,000000] | crc(0000000000) | bbb |
| | END | --- | ---------- | 0 | Dec 31 1969 | uid[000000,000000] | crc(0000000000) | <dirend> |
| ELEMENT 3 | DIR | ADD | drwx------ | 0 | May 27 17:15 | uid[000000,000000] | crc(0000000000) | ccc |
| | END | --- | ---------- | 0 | Dec 31 1969 | uid[000000,000000] | crc(0000000000) | <dirend> |
| ELEMENT 4 | DIR | NOC | drwx------ | 0 | May 27 17:15 | uid[000000,000000] | crc(0000000000) | ddd |
| | END | --- | ---------- | 0 | Dec 31 1969 | uid[000000,000000] | crc(0000000000) | abc |
| ELEMENT 5 | DIR | NOC | drwx------ | 0 | May 27 17:15 | uid[000000,000000] | crc(0000000000) | <dirend> |
| | END | --- | ---------- | 0 | Dec 31 1969 | uid[000000,000000] | crc(0000000000) | efg |
| ELEMENT 6 | DIR | NOC | drwx------ | 0 | May 27 17:15 | uid[000000,000000] | crc(0000000000) | <dirend> |
| | END | --- | ---------- | 0 | Dec 31 1969 | uid[000000,000000] | crc(0000000000) | efg |
| ELEMENT 7 | DIR | NOC | drwx------ | 0 | May 27 17:12 | uid[000000,000000] | crc(0000000000) | <dirend> |
| | END | --- | ---------- | 0 | Dec 31 1969 | uid[000000,000000] | crc(0000000000) | mmm |
| ELEMENT 8 | DIR | DEL | drwx------ | 0 | May 27 17:15 | uid[000000,000000] | crc(0000000000) | <dirend> |
| | END | --- | ---------- | 0 | Dec 31 1969 | uid[000000,000000] | crc(0000000000) | xxx |
| | NRM | DEL | -rw------- | 569 | May 11 1998 | uid[000000,000000] | crc(3564886220) | agent.reg |
| | NRM | DEL | -rw------- | 287 | Apr 22 14:47 | uid[000000,000000] | crc(2653417408) | questd.reg |
| | NRM | DEL | -rw------- | 251 | Feb 11 16:54 | uid[000000,000000] | crc(683833640) | sqlserver.reg |
| | END | --- | ---------- | 0 | Dec 31 1969 | uid[000000,000000] | crc(0000000000) | <dirend> |
| | DIR | DEL | drwx------ | 0 | May 27 17:15 | uid[000000,000000] | crc(0000000000) | yyy |
| | END | --- | ---------- | 0 | Dec 31 1969 | uid[000000,000000] | crc(0000000000) | <dirend> | o o o

| LOCATION | FILES (FILENAME: VERSION) | | | |
|---|---|---|---|---|
| VERSION 31-32 | A:31 | B:30 | E:1 | |
| VERSION 32-33 | A:32 | | | |
| VERSION 33-34 | A:33 | B:32 | F:10 | |
| VERSION 34 | A:34 | B:34 | C:28 | D:25 |

Versions 31-32, 32-33, 33-34 are BACKUP.

FIG. 8

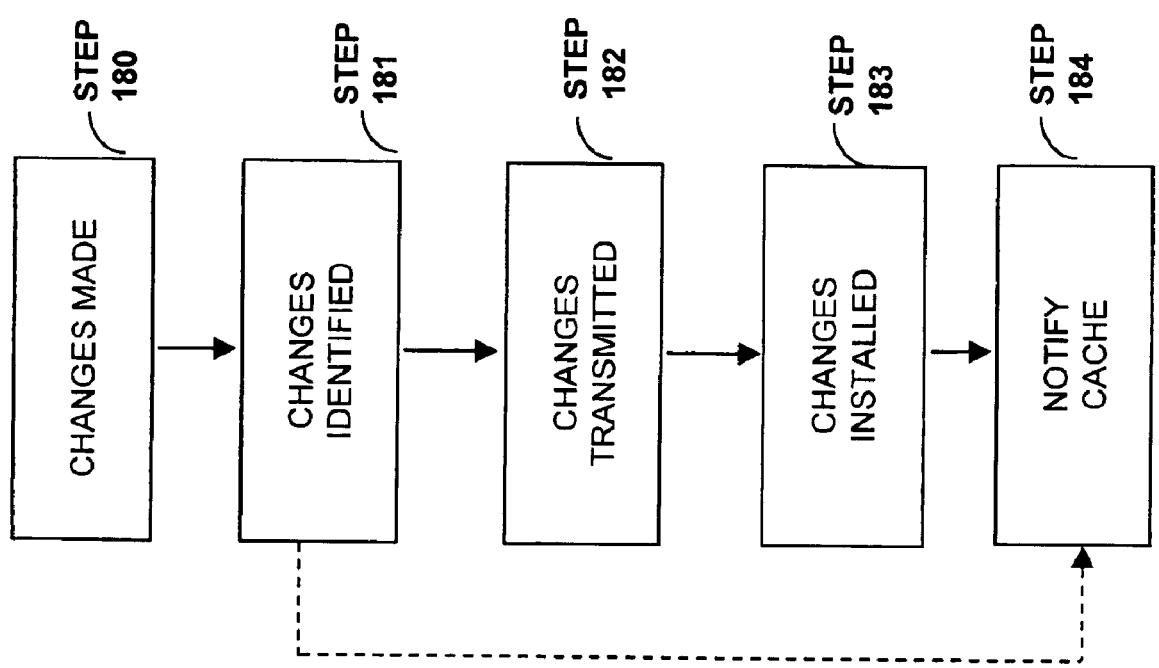

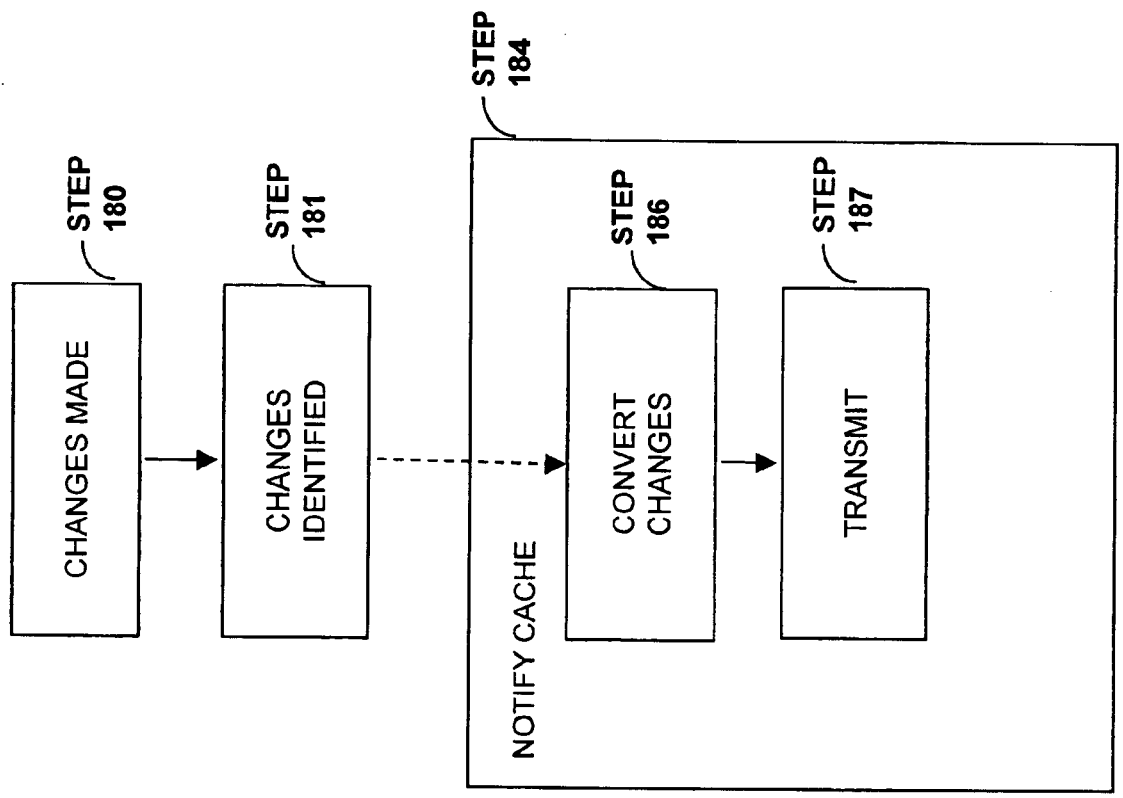

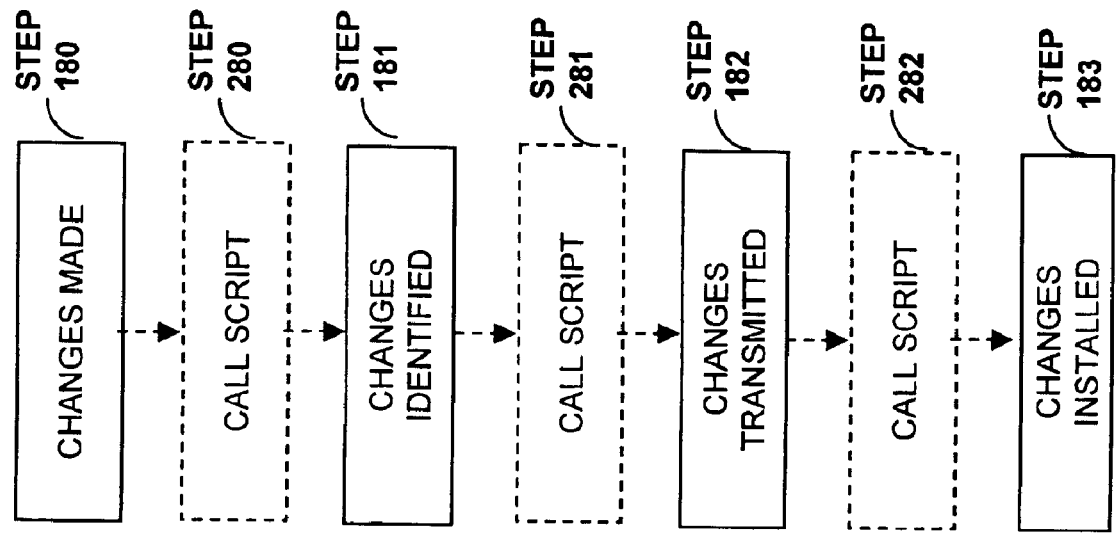

```
401 — BEGINPARAMS
402 — SCALAR FORMATVERSION 1
403 — SCALAR JOBNAME EXAMPLEJOB
404 — SCALAR JOBSTATE INPROGRESS
405 — SCALAR MAPPINGNAME ALLIMAGES
406 — SCALAR MANIFESTFILE /TMP/STAGING/23423.TXT
407 — SCALAR SOURCEDIR /SOURCE/IMAGES
408 — SCALAR REVERTDIR /REVERT/IMAGES
409 — ARRAY DESTINATIONS 2
410 — BEGINELEMENT
411 — SCALAR NAME OOLONG
412 — SCALAR DIRECTORY /HOME/HTTPD-OOLONG/DOC/IMAGES
413 — SCALAR STATE NORMAL
414 — ENDELEMENT
415 — BEGINELEMENT
416 — SCALAR NAME DARJEELING
417 — SCALAR DIRECTORY /HOME/HTTPD-DARJEELING/DOC/IMAGES
418 — SCALAR STATE NORMAL
419 — ENDELEMENT
420 — ENDPARAMS
```

FIG. 13

WEB SERVER CONTENT REPLICATION

CROSS-REFERENCE TO RELATED APPLICATIONS

This application is a continuation-in-part of U.S. patent application Ser. No. 09/086,821, filed May 29, 1998, and this application is a continuation-in-part of U.S. patent application Ser. No. 09/086,836, filed May 29, 1998 now U.S. Pat. No. 6,317, 786, and this application is a continuation-in-part of U.S. patent application Ser. No. 09/086,874, filed May 29, 1998 now U.S. Pat. No. 6,279, 001, and this application is a continuation-in-part of U.S. patent application Ser. No. 09/087,263, filed May 29, 1998 now U.S. Pat. No. 6,314,463, and this application claims priority to U.S. Provisional Patent Application Ser. No. 60/117,674, filed Jan. 28, 1999.

TECHNICAL FIELD

This invention relates to managing multiple web servers, and more particularly to a web service system that allows a system operator to distribute content to each web server in the web service system.

BACKGROUND INFORMATION

In a computer network environment, web servers are used to respond to users' web page requests, which are transmitted over the computer network. Web page requests, also referred to as content requests, typically are made by a browser running on a user's computer. A web server monitors one or more computer network address/port endpoints for web page requests and responds to the web page requests by transmitting web pages to the requester. Web servers may be special purpose devices, or they may be implemented with a software program running on a general purpose computer. The service capacity of a web server limits the number of web page requests that may be received and responded to in a given time interval.

A web service system may include one web server or more than one web server. Generally, when a web service system includes more than one web server, the web service system is designed so that the multiple web servers each respond to web page requests. Typically, a user's web page request is directed towards one of the web servers, and that web server responds to that web page request. It is also typical for web service systems designed to receive a large number of web page requests to include many web servers.

In general, in a system with multiple web servers, a system operator or operators manage the content offered by the various web servers. A system operator may sometimes wish to coordinate the content on the system, for example, to make sure that the content on various web servers is identical, or to have some content available from one web server and other content available from another web server. This can be difficult to accomplish, especially if content updates are to be transparent to users, who can potentially be in the middle of an interaction with the system involving a series of related web pages.

Managing content is also a problem for caching servers. Caching servers "cache", or temporarily store, the results of requests relayed from a browser to a web server for use in satisfying subsequent identical requests. A challenge in caching server design and operation is determining when the stored (cached) content is no longer consistent with the content on the original server, that is, when the cached content is invalid. The hypertext transfer protocol ("http") includes a mechanism for the original server of some content to specify the duration for which a cache server should retain a copy of the content. For some content, however, it is not possible for the original server to accurately determine in advance how long the content will remain valid, and there may be times when content is unexpectedly updated sooner than the expiration time specified by the original server.

SUMMARY OF THE INVENTION

In a web service system with one or many web servers, a system and method for managing and distributing the content on the one or more web servers is useful to a system operator. For example, content updates are often desired to be performed on a rapid basis. Scheduling and automation can be used to update content on the servers in an efficient and consistent manner. Also, it is helpful to identify content update failures, take a failed server out of service, fix it, and return it to service in the web service system as quickly as possible. It is desired to maximize web site availability, even as updates occur, while minimizing disruption of transactions. Changes may require that a server be restarted, for example if the content is served using a shared library that will not be unloaded (and/or updated) until the web server process(es) exit.

A web service system according to the invention correctly and efficiently updates changed content on the one or more web servers in the system, so that the changes are consistent among the web servers and so that the changes do not require excessive network bandwidth. This is accomplished such that the content change is not noticeable to a browser engaged in a transaction with a web server, and so that content versions are preserved, both for consistency of transactions started using older content, and so that a web server can revert to the older content if there is a problem with an update. A web service system of the invention also can track content changes, and notify caching servers as appropriate that cached content has become invalid.

Generally, in one aspect, the invention relates to a system and method for replicating changes in a source file set on a destination file system. Changes in a source file set are identified. The changes are stored in a modification list. The modification list is transmitted to an agent having access to a destination file system. In one embodiment, the changed files are transmitted to the agent. In another embodiment, the changed files are installed on the destination file system. In another embodiment, the changes are identified by inspecting a set of files and comparing the set of files to an earlier-recorded set. In another embodiment, the changes are identified by installing a device driver to perform file operations and by recording, by the device driver, changes to the source file set. In another embodiment, the changes are identified by receiving a manifest describing changes to the source file set. In another embodiment, the files are compared by comparing a file attribute to the file attribute of the earlier-recorded set. In one embodiment, the file attribute comprises at least one attribute chosen from the set of file size, file permissions, file ownership, modification time, and a hash of the file. In another embodiment, the method includes calling a script before identifying the changes. In another embodiment, the method includes calling a script before transmitting the changes. In another embodiment, the method includes calling a script after transmitting the changes. In another embodiment, the method includes calling a script after determining whether the transmission has completed successfully.

In general, in another aspect, the invention relates to a system and method for replicating changes in a source file set on a destination file system. Changes in a source file set are identified. The identified changes are stored in a modification list including uniform resource locators specifying the changed files. The modification list is transmitted to at least two web servers. In one embodiment, the transmission is accomplished by multicasting. In one embodiment, the changes are identified by inspecting a set of files and comparing the set of files to an earlier-recorded set. In another embodiment, the files set is compared to an earlier-recorded set by comparing a file attribute to the file attribute of the earlier-recorded set. In another embodiment, the file attribute comprises at least one attribute chosen from the set of file size, file permissions, file ownership, modification time, and a hash of the file.

In general, in another aspect, the invention relates to a web service system. The system includes a manager for managing the web service system. The system also includes a host comprising a web server for receiving web page requests and an agent in communication with the manager. The system also includes a content distributor for providing content changes to the host. In one embodiment, the system includes an traffic manager for directing web page requests. In another embodiment, the content distributor includes an identification module for identifying changes in a source file set, a modification list for storing identified changes; and a transmitter for transmitting the modification list to an agent having access to a destination file system. In another embodiment, the system includes a transmitter for transmitting the changed files to the agent. In another embodiment, the agent includes an installer for installed the changed files on the destination file system.

In general, in another aspect, the invention relates to a content distributor. The content distributor includes an identification module for identifying changes in a source file set. The content distributor also includes a modification list for storing identified changes. The content distributor also includes a transmitter for transmitting the modification list to an agent having access to a destination file system. In one embodiment, the content distributor includes a transmitter for transmitting the changed files to the agent.

The foregoing and other objects, aspects, features, and advantages of the invention will become more apparent from the following description.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 6 is an example list of changed files.

FIG. 7 is an example embodiment of a manifest showing the changed files of FIG. 6.

FIG. 8 is an example of an embodiment of old version maintenance.

FIG. 10 is a flowchart of an embodiment of a method for distributing content.

FIG. 11 is a flowchart of the operation of another embodiment of the content distributor.

FIG. 12 is a flowchart of the operation of another embodiment of the content distributor.

FIG. 13 is an example of the information provided to a script in the embodiment of FIG. 12.

DESCRIPTION

A system for serving web pages has a plurality of web servers and provides a system operator with features and tools to coordinate the operation of multiple web servers. The system might have only one web server, but typically it includes more than one. The system can manage traffic by directing web page requests, which originate, generally, from web browsers on client computers, to available web servers, thus balancing the web page request service load among the multiple servers. The system can collect data on web page requests and web server responses to those web page requests, and provides reporting of the data as well as automatic and manual analysis tools. The system can monitor for specific events, and can act automatically upon the occurrence of such events. The events include predictions or thresholds that indicate impending system problems. The system can include crisis management capability to provide automatic error recovery, and to guide a system operator through the possible actions that can be taken to recover from events such as component failure or network environment problems. The system can present current information about the system operation to a system operator. The system can manage content replication with version control and data updates. Some or all of this functionality can be provided in specific embodiments.

Figure 1:
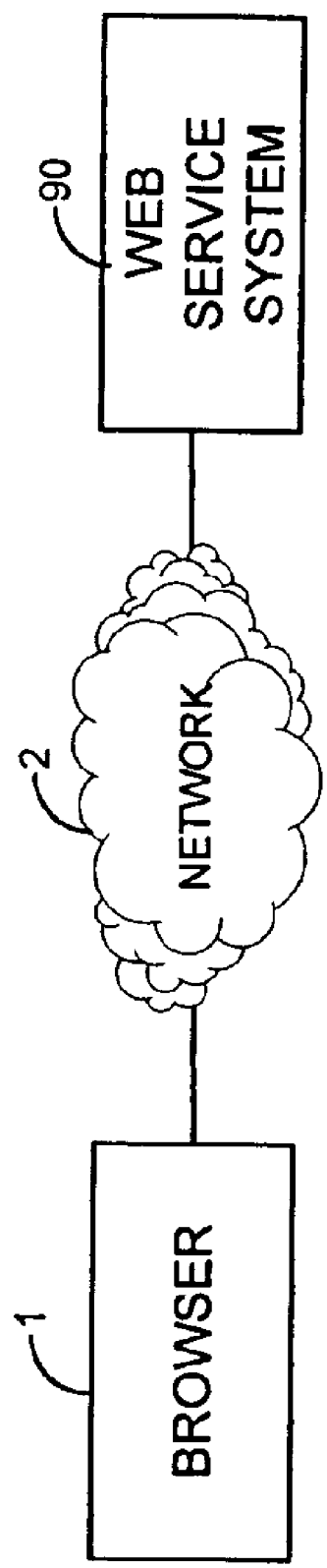
FIG. 1 is a block diagram of an embodiment of a web service system according to the invention.

Referring to FIG. 1, an embodiment of a web service system 90 receives web page requests from a browser 1. In this context, a web page is electronic content that can be made available on a computer network 2 in response to a web page request. Requests typically originate from web browsers 1. An example of a web page is a data file that includes computer executable or interpretable information, graphics, sound, text, and/or video, that can be displayed, executed, played, processed, streamed, and/or stored and that can contain links, or pointers, to other web pages. The requests are communicated across a communications network 2. In one embodiment, the communications network 2 is an intranet. In another embodiment, the communications network 2 is the global communications network known as the Internet. A browser 1 can be operated by users to make web page requests. Browsers 1 can also be operated by a computer or computer program, and make requests automatically based on the computer's programming. The web page requests can be made using hypertext transfer protocol ("http") format, and also can be made using other protocols that provide request capability.

Figure 2:
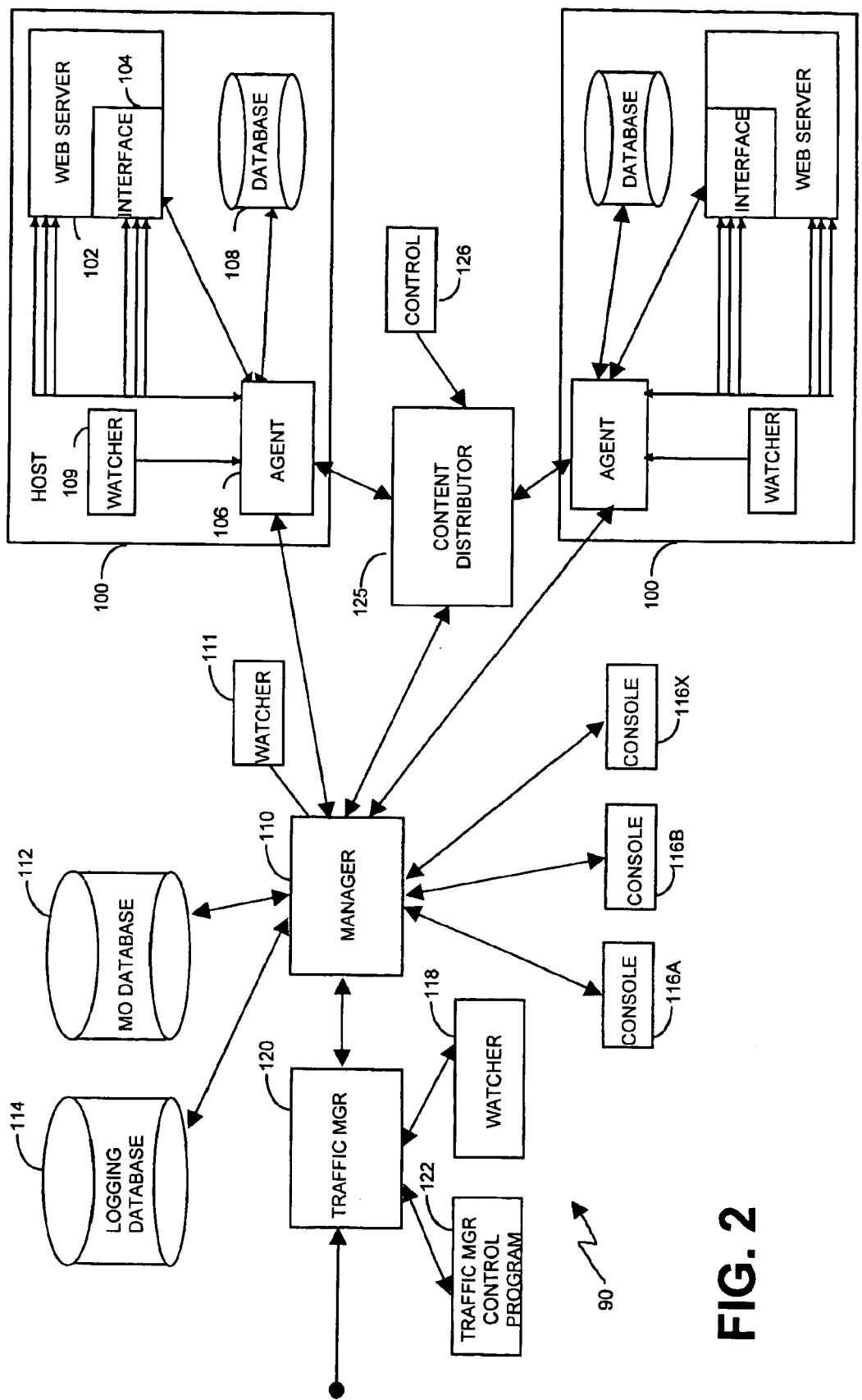
FIG. 2 is more detailed block diagram of an embodiment of a web service system.

Referring to FIG. 2, an embodiment of a web service system 90, includes various components 100–126. The components communicate over one or more computer networks. The physical location of the components does not impact the capability or the performance of the system, as long as the communications links between the various components have sufficient data communication capability. The web service system 90 can function across firewalls of various designs, and can be configured and administered remotely.

The web service system 90 manages one or more hosts 100. One host 100 is shown as an example. An embodiment of the web service system 90 can have any number of hosts 100. Each host 100 can be a computer system commercially available and capable of using a multi-threaded operating system such as UNIX or Windows NT. Each host 100 can have at least one network connection to a computer network, for example the Internet or an intranet, or any other network, that allows the host 100 to provide web page data in response to web page data requests. Each host 100 includes at least one web server 102.

The web server 102 can be any web server that serves web pages in response to web page requests received over a computer network. Two examples of such web servers are commercially available as the NETSCAPE ENTERPRISE SERVER, available from Netscape Communications Corporation of Mountain View, Calif. and the MICROSOFT INTERNET INFORMATION SERVICES SERVER, available from Microsoft Corporation of Redmond, Wash. The web server 102 is capable of receiving web page requests from web clients, also referred to as browsers and/or web page requesters. A web page request from a browser is also referred to as a content request, or from the point of view of a web server, as a "hit." Often the web page requests are part of a series of communications with the web server 102 involving several requests and responses. One such series, referred to as a session, is an extended interaction with the web server. A shorter interaction, for example the purchase of an item, is referred to as a transaction. A session could involve several transactions. The user interacts with a web server 102 by making an initial request of the web server 102, which results in the web server 102 sending a web page in response. The web page can contain information, and also pointers to other requests that the user can make of the web server 102 or perhaps other web servers. Sometimes the requests are for information that must be retrieved from a database, and sometimes the request includes information to be stored in a database. Sometimes the request requires processing by the web server 102, or interaction with another computer system. Sophisticated web servers and browsers can interact in various ways.

An aggregation of related web pages presented to a user as a set of web pages about a related topic, or from a particular source, usually, but not always from the same web server 102, is referred to as an application. One example of an application is a set of pages providing information about a company. Another example of an application is a series of pages that allow a user to conduct transactions with her savings bank. Two sets of web pages may be considered a single application, or they can be considered two separate applications. For example, a set of web pages might provide information about a bank, and a customer service set of web pages might allow transaction of business with the bank. Whether a set of web pages is considered to be one application or several applications is a decision made by the application designer. The web service system 90 is capable of delivering one or more applications to users. The web service system 90 can be configured so that some subset of the web servers 102 exclusively serve a single application. In one embodiment, some web servers 102 serve a subset of the available applications, and other web servers 102 serve other applications. In another embodiment, all web servers 102 serve all available applications.

The web pages that are presented to the user in response to web page requests from the user's web browser can be stored on the host 100 or on a file system accessible to the web server 102. Some or all of the web page content can be generated by the web server 102 by processing data available to the web server 102. For example, for web pages that are documents about a topic, the web pages can be created (designed) and stored in the web server 102 file system. In response to a web page request, such a web page can be sent to the user just as it is stored in the file system. In a banking transaction system, however, it is likely that information about the user's bank account will be stored in a database. The web server 102 can generate a web page containing the user's account information each time the user requests the page. Often, web pages are stored partially in the file system, and partly are generated by the web server 102 when the request is made.

Various techniques are used to store status information, also referred to as the "state" of a user's session with the web server 102. The user can develop a state during her interaction with the web server 102 via the requests made to the web server 102 and the web pages received in response to those requests. The user's state can, as one example, include information identifying the user. As another example, the state can include information specifying web pages the user has already requested, or the options the user has selected in her interaction with the system. As another example, the state can include items the user has selected for purchase from a commercial sales application. Generally some information about or identifying the state of the session is stored in the client web browser, for example as a cookie as described below, and some information can be stored in the web server 102.

A host 100 can have any number of web servers 102 running on it, depending on host capacity, performance, and cost considerations. In one embodiment, the host 100 includes one web server 102. In other embodiments, a host includes more than one web server 102. The one web server 102 on host 100 is a simplified illustrative example and are not intended to limit the number of possible web servers 102. Each web server 102 monitors at least one network address and port, also referred to as an endpoint. A particular address and port is called an endpoint because it is a virtual endpoint for communication—a network connection is made between one address/port endpoint and another. A web server 102 receives requests directed to one of its endpoints and responds to those requests with data in the form of web pages.

A web server 102 that accepts requests at multiple network address/port endpoints can perform as if it were a plurality of distinct web servers 102 even though it is actually implemented as one web server 102. Such a web server is referred to as a multiple endpoint web server. For the purposes of this discussion, a multiple endpoint web server can be described as if it were in fact multiple web servers 102 with each web server 102 receiving requests on a network address/port endpoint. In one embodiment, such a multiple endpoint web server has one web server interface 104 that is the interface for all of the multiple endpoints.

Each web server 102 can have associated with it a web server interface 104. The web server interface can be a plug-in, filter, or other software associated with the web server 102 that serves as an interface between the web server 102 and other components of web service system 90. In this context, the term web server interface is distinct from the network interface that can be present on the host 100. For example, the web server 102 has a web server interface 104. Each web server interface 104 can communicate with an agent 106 on each host 100.

A host 100 includes an agent 106. The agent 106 provides a web service system 90 interface with the host 100. The agent 106 links the web server interface 104 with the web service system 90. The agent 106 also links the host 100 with the web service system 90. Even on a host that has multiple web servers, there is generally only one agent 106 running on the host 100, however it is possible to have more than one. Each agent 106 has access to a database 108, which contains information about the system components.

The agent 106 on a host 100 communicates with a web service system manager 110. The manager 110 receives information from the agents 106 about the status of the hosts 100 and the web servers 102. The manager 110 can send commands to the agents 106 to configure the hosts 100, to start, stop, or pause the web servers 102, and to manage the load on the web servers 102. The manager 110 has access to a logging database 114 that is used for logging system activity and events. The manager 110 also has access to a managed object database 112, used for storing information about the various components of the system. The manager 110 is also in communication with one or more consoles 116A–116X, generally referred to as 116. The consoles 116 provide a user interface for the system operator. The system operator can monitor the status of the system and configure the system via a console. The manager 110 can be run on the same host 100 as other web service system 90 components, such as one of the web servers 102 or a traffic manager 120, or on another computer of sufficient capacity.

The manager 110 communicates with a traffic manager 120, also referred to as an interceptor. The traffic manager 120 directs web page requests to a web server. The invention is not restricted to any particular type of traffic manager 120, but rather is intended to work with any sort of traffic manager 120 that directs web page requests to web servers 102.

In one embodiment, the traffic manager 120 receives information and commands from the manager 110. The traffic manager 120 also receives information and commands from a control program 122. The traffic manager control program can be on the same computer system as the traffic manager 120, or alternatively it can run on another system. The traffic manager 120 receives web page requests and refers the requests to one of the web servers. Part of the management capability of the web service system 90 is accomplished by monitoring the web page requests made of the web servers 102 and the resulting load on the web servers 102 and the hosts 100. Web page requests can be directed to balance the load among the web servers 102. In one embodiment, the traffic manager 120 is the point of first contact for a user. The traffic manager 120 receives a web page request from a user and "refers" the user's web browser to an appropriate web server 102 for that request. The user's web browser is referred by responding to the web page request with a referral to a web page on an appropriate web server 102. This referral capability can be accomplished with a capability incorporated into the hypertext transfer protocol, but can also be accomplished in other ways. The user may or may not be aware that the web browser has been referred to an appropriate web server 102. The user accesses the application on that web server 102 and receives responses to its web page request from that web server 102. In one embodiment, if a web server 102 becomes overloaded, that web server 102, under the direction of the manager 110, can refer the user back to the traffic manager 120 or to another web server 102 capable of delivering the application.

The traffic manager 120 receives requests from users and redirects the user's requests to web servers 102. In one embodiment, the traffic manager 120 is used to direct all users to one web server 102, such as another traffic manager 120 or a single endpoint. In this manner, the traffic manager 120 acts as a shunt, meaning it directs all requests directed towards one or more web servers on a host to another web server 102. In another embodiment, the traffic manager 120 receives status information from the manager 110 and uses that information to redirect users. The status information includes server availability and load, administrator's changes, and application or web server 102 start and shut down actions. The traffic manager 120 is designed for speed and security. The traffic manager 120 is often the front door to the system, and so its performance affects the perceived performance of the entire web service system 90. It may be useful to locate the traffic manager 120 as close, in the network topology sense, to the backbone as possible. It is then necessarily the most exposed component of the web service system 90.

In one embodiment, the traffic manager 120 is implemented in hardware. In another embodiment, the traffic manager 120 is a software program running on a host computer. In one software embodiment, the traffic manager 120 is a standalone program that runs on a server-class computer capable of running a multi-threaded operating system. Under UNIX, for example, the traffic manager 120 can run as a daemon. Under Windows NT™, the traffic manager 120 can run as a service.

In another embodiment, the traffic manager 120 is an internet protocol bridge or router that directs requests made to one endpoint to the endpoint belonging to a web server 102. In this way, the traffic manager 120 directs the web page requests to one or more web servers 102. An example of such a traffic manager is the LOCALDIRECTOR available from Cisco Systems, Inc. of San Jose, Calif. In yet another embodiment, the traffic manager 120 is a web switch, such as a CONTENT SMART WEB SWITCH available from Arrowpoint Communications, Inc. of Westford, Mass. The traffic manager 120 receives each web page request and, based on the request, directs the request to a web server.

The web service system 90 also includes a version controller, also referred to as a content distributor 125. The content distributor 125 manages version and content replication, including content updates on the various web servers 102 in the web service system 90. A system operator interface to the content distributor 125 is provided by a content control 126. In one embodiment, the content distributor 125 and the content control 126 are each a standalone process that operates on the host 100. In another embodiment, the content distributor 125 and the content control 126 operate on the same host as the manager 110. In still other embodiments, content distributor 125 and the content control 126 operate on other hosts. The content distributor 125 and the content control 126 can operate on the same host, or on a different host. In other embodiments, the content distributor 125 is incorporated into the functionality of the manager 110, or other components of the system 90.

The content distributor 125 transmits information to the agent 106, and through the agent 106 to the web server interface 104. The transmitted information describes changes to a set of content directories and files that are referred to as the source files, and are generally organized in a hierarchical directory structure. These source files are the "master" copy of the content for the web servers. Together, the directories and files are referred to generally as the source files or the source file set. The source file set can be stored on a source host, also referred to as a staging server, which is typically, but not necessarily, the host on which the content distributor 125 is running. For simplicity of explanation, in the following discussion, content directories and files, either the source files or on a host 100, generally are referred to just as files. The source file set can include both directories and files, and changes to the files can also include the addition, deletion, and modification of directories.

Figure 3:
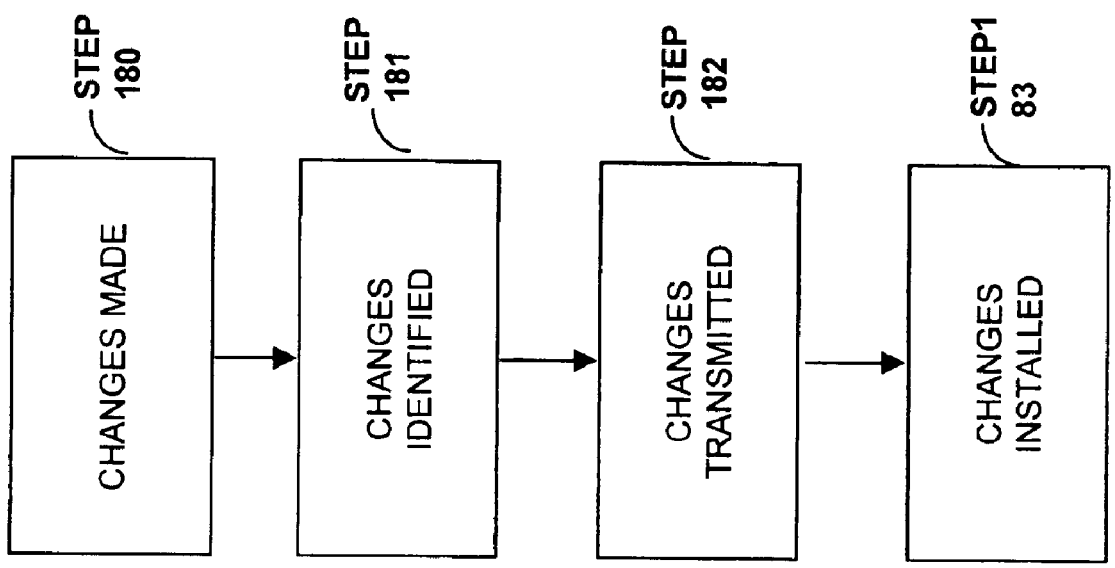
FIG. 3 is a flowchart of the operation of an embodiment of the content distributor of FIG. 1.

Referring to FIG. 3, changes are made over some period of time to the source file set (STEP 180). The changes that are made include such changes as the creation of new files, deletion of old files, replacement of existing files with new content (i.e. modifying file content), and modifying file attributes such as permission restriction and ownership. Again, although changes to files are described, it is intended that changes to directories also are included. Changes are made by editing the files using such editing techniques and tools known in the art, including application programs and operating system utilities. Changes may be tested, and approved in development and approval process. There may in fact be no changes to the files at a particular time, and the system can recognize this. In such cases, after identifying the absence of changes, there is no further processing until the next time possible changes would be identified.

The content distributor identifies the changes to the files (Step 181). Changes to the files can be identified in a number of ways. In one embodiment, the content designer provides a manifest, which is a list of changes. The designer keeps track of the changes, and manually identifies the changes to the content distributor, for example using the content control user interface 126, or by communicating a manifest to the content distributor 125. In another embodiment, the software and systems used by the content designer to design the content tracks changes and provides a manifest of changes that are communicated to the content distributor 125.

In another embodiment, the content distributor 125 integrates with the operating system file services and monitors changes to the source file set. In one such embodiment, a software device driver "monitor" is installed that is invoked by the operating system to perform file operations. The device monitor acts as a pass-through device driver that passes data between the operating system and the actual device driver (i.e. hard disk driver software). In addition to passing the disk I/O commands through to the disk driver, the device monitor observes those I/O commands, and records changes to the source file set. In one embodiment, the device monitor is integrated with the content distributor 125. In another embodiment, the device monitor produces a manifest that is communicated to the content distributor 125.

In yet another embodiment, the content distributor 125 performs a comparison between a current source file set and a previous source file set to determine the changes to the source file set. The content distributor maintains a list of the files that were present the last time that an update was made for comparison purposes. This list includes the file name and other file properties, such as the file size, the date/time that the file was last modified, a hash code of the contents, the permissions and/or access control restrictions, and user/group ownership. In one embodiment, the list of files includes a complete copy of every file in the previous source file set, however, for large file systems this embodiment is very inefficient. In a more efficient embodiment, only a list of the previous files and certain file attributes are needed, as described below. The steps of identifying changes (STEP 181), transmitting changes (STEP 182), and installing the changes (STEP 183), are sometimes referred to as an update.

Figure 4:
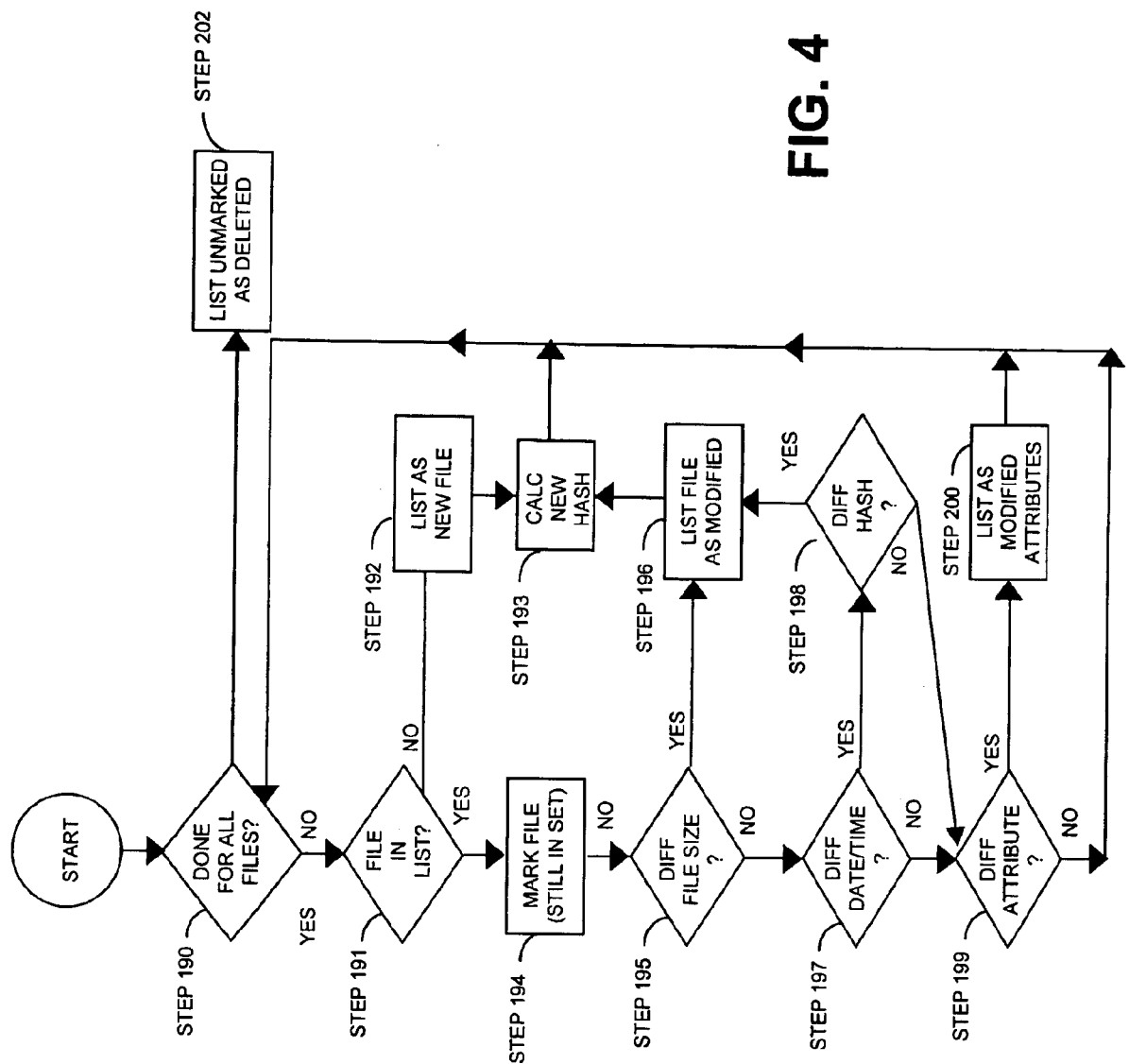
FIG. 4 is a flowchart of a comparison of the current source file set and a previous file set.

Referring to FIG. 4, in one embodiment, the comparison between the source file set and the previous file set takes place by analysis of the files (and directories) in the source file set. For each file in the source file set (STEP 190), the content distributor compares the files in the source file set with the information describing the previous source file set, which in one embodiment is in the form of a list as described above. For each file, the content distributor determines if the file is in the previous source file set list (STEP 191). If it is not, the file is listed as a new file (STEP 192), indicating that the file has been added to the source file set, and a hash is calculated on the file (STEP 193). If the file is listed, the file listing is marked (STEP 194) to indicate that the file is still included in the file set. This is later used to determine if any files on the previous list are missing, that is whether they have been deleted.

The size of the file is compared to the information in the list (STEP 195). If the file size is different, the file is considered to be modified, and is listed as such (STEP 196). A new hash of the file is calculated and stored in the list (STEP 193). If the size is the same, the date/time is compared (STEP 197). If the date/time is different, the hash of the file is calculated and compared to the hash included in the previous list (STEP 198). In this context, a hash is a calculation made on the content of the file that results in a single number that is related to the file content. Such a hash is also referred to as a message integrity code. Examples of hash codes are checksums and a cyclic redundancy codes. If the hash of a file is different, the file is listed as modified (STEP 196), and the new hash is stored (STEP 193) in the list. Otherwise, if the file attributes (owner, group, etc.) have changed (STEP 199), the file is listed as having modified attributes (STEP 200).

In one embodiment, if the file contents have not changed, the system also determines whether file attributes changed (Step 199). In another embodiment, attribute information is sent as a part of the content update. When these steps have been completed for all files in the source file set, markings from STEP 194 are checked to see if any files that were previously listed are now missing, meaning that they have been deleted from the file set (STEP 200). Files not marked are listed as deleted (STEP 202).

Changes to the source file set are identified to the content distributor 125 in a change list, also referred to as a manifest. In one embodiment, the manifest contains entries that indicate changes to a file such as additions, deletions, content modifications, and/or attribute modifications. For example, the add statement "ADD source/dir/dir/file1" indicates that a file file1 has been added, and the statement "CHMOD source/file2" indicates that permissions associated with file "file2" have changed. Other statements include "DELETE" to indicate removal of a file, and "MODIFY" to indicate a change of content. Additional attribute differences also use the CHMOD statement, or might have specific statements of their own, such as CHOWN for a change of ownership, or CHGRP for a change of group association.

Figure 5:
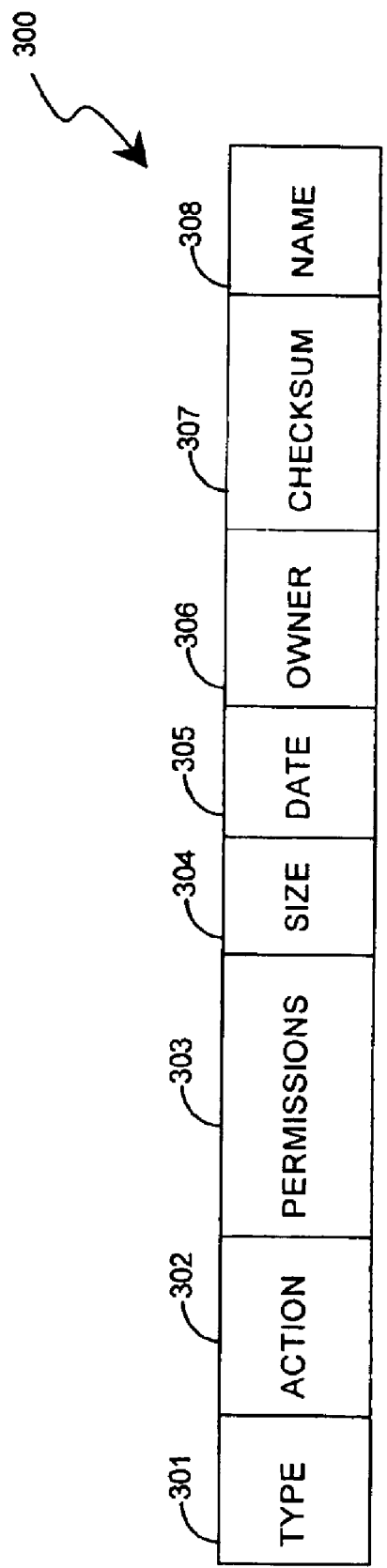
FIG. 5 is an embodiment of a manifest entry.

Referring to FIG. 5, in one embodiment, a manifest entry 300 includes at least eight information elements 301–308. In one embodiment, each entry is stored in a text format, so that the information can be read by a system operator with a simple text editor or interpreted by other software. In another embodiment, each entry is stored in binary format that contains the same information as in the text format, but is more compact. The binary format can be converted with a conversion tool to the text format. The text format can also be converted to a binary format.

In one embodiment, the manifest entry 300 includes a file type field 301. Possible file types are directory, file, symbolic link, hard link, or end-of-directory marker, which comes after the last file in a directory. In a text embodiment, each file is described with a three letter code such as "DIR" for directory, "END" for end-of-directory marker, "NRM" for normal file, "LNK" for a symbolic link, and "HLK" for a hard link. In a binary embodiment, each choice is represented by an integer code. For example, in one embodiment, a directory is represented by the number 1, and a file is represented by a 2, and so on.

The manifest entry 300 also includes an action taken field 302. In the text embodiment, the action taken is a three letter code, such as "ADD" for an added file, "CHG" for changed content, "CHP" for changed owner, group, or permissions, and "DEL" for a deleted file. The three letter code "NOC" is used to describe a file that has not changed. In a binary embodiment, each choice is represented by an integer code. For example, in one embodiment, an added file is represented by the number 1, a changed content is represented by a 2, and so on.

The manifest entry 300 also includes a permission field 303, which describes the file access permissions, as well as other information about the file. In a text embodiment, the permissions are stored, UNIX-style, as four 3-item binary entries (i.e. rwxrwxrwx), where the first 3-item entry describes whether an executable program will run as the user, and the following three entries show read, write, and execute permissions for the owner, group, and public, respectively. In a binary embodiment, the permission information is stored as a binary integer that is the four-digit octal number that represents the permissions.

The manifest entry 300 also includes a file size field 304, which describes the size of the file. In a text embodiment, the file size is written in ASCII characters. In a binary embodiment, the file size is stored as an integer.

The manifest entry 300 also includes a date/timestamp 305. In a text embodiment, the date and time are written in ASCII characters. In a binary embodiment, the date/time is stored as an integer representing the number of seconds since midnight Jan. 1, 1970.

The manifest entry 300 also includes ownership information 306. This information includes two parts—the user identifier of the file owner, and the group identifier of the group owner. In a text embodiment, the owner and group identifiers are stored as ASCII strings. In a binary embodiment, the owner identifier and group identifier are each stored as integers.

The manifest entry 300 also includes a checksum 307 or hash result. In a text embodiment, this is stored as an ASCII string. In a binary embodiment, the checksum is stored as an integer. The manifest entry also includes the relative path name 308 of the file. In both text and binary embodiments, the relative path name 308 is stored as an ASCII string.

Referring to FIG. 6, an example list of changes shows added files aaa (which is a directory), files agent.reg, questd.reg, and sqlserver.reg in directory aaa, and files bbb and ccc, which are also directories. Directory ddd, and files abc and efg in directory ddd are unchanged. Directory efg is also unchanged. Directories mmm, xxx, and yyy are deleted, and files agent.reg, questd.reg, and sqlserver.reg are deleted from directory xxx.

Referring to FIG. 7, an example of a text embodiment of a manifest of the format of FIG. 5 reflects the changes listed in FIG. 6. In the first entry, ENTRY 1, the directory aaa is listed in the file name 308. The file aaa is listed as type 301 "DIR." The action 302 for this file is "ADD," indicating that the file was added. The permissions 303 are listed UNIX-style, and show that the file is a directory, and that the owner has read, write, and execute permissions. The file size 304 is listed as zero. The date/timestamp 305 of the file is listed as May 27 17:12. The user and group identifiers 306 are both listed as identifier 0. The checksum of the file 307 is zero.

In the second entry, ENTRY 2, the file listed in the file name 308 is agent.reg. This file, agent.reg. Because ENTRY 2 is between the aaa directory entry (ENTRY 1) and the END statement (ENTRY 5), this file is in directory aaa. The file agent.reg is of type 301 normal, and was added as new file, as shown in the action element 302. The permissions 303 indicate that the owner has read and write permission. The file size 304 is 569 bytes. The date 305 of the file is May 11, 1998. The user and group identifiers 306 are both zero. The checksum 307 is 3564886220.

The fifth entry, ENTRY 5, is of type 301 END marker, which indicates the end of listings for directory aaa. The sixth entry, ENTRY 6, directory bbb is not a subdirectory of aaa, because it is listed after the aaa END marker.

Referring again to FIG. 3, in one embodiment, the content distributor creates the manifest, for example by determining the changes using the method of FIG. 4. In another embodiment, the manifest is communicated to the content distributor. In one embodiment, the manifest is communicated by storing the manifest in a particular location (i.e. directory and filename), where the content distributor is configured to find it. In another embodiment, the manifest is communicated to the content distributor by explicitly transmitting it to the content distributor 125 over a network.

After the changes have been identified (STEP 181), for example using the embodiment of FIG. 3, the changes are transmitted to the agent (STEP 182). Often, the changes are mapped to a particular directory on the host file system. In one embodiment, the source file set is mapped to the various hosts' file systems as shown in the example in Table 1:

TABLE 1

Example Mapping of Source Directory to Destination Host Directory

| Source Host | Source Directory | Destination Host | Destination Directory |
|---|---|---|---|
| staging.atreve.com | /usr/netscape/docs/appl | www1.atreve.com | /usr/netscape/docs/appl |
| | | www2.atreve.com | /docs/current/appl |
| | | www3.atreve.com | /usr/netscape/docs/al |

As can be seen from Table 1, the system administrator can map the files in the source file set from the staging server file system to the file systems on the various web servers. Use of the actual file system identifier, and not a URL, allows mappings of shared libraries and other files that may not be identifiable with a Uniform Resource Locator ("URL"). For example CGI scripts might not be mapped if a URL was used since such files generally are not available from the web server via web page requests, and so do not have a URL. It would be possible to use the URL instead of the file system identifier, so that the mapping is not necessary, but at the tradeoff of restricting the type of files that can be modified. If URLs were used, only files that were accessible from the web server via web page requests would be accessible.

In one embodiment, the files in a source file set directory hierarchy are combined into a single archive file, and that archive file is compressed. Any file that is larger than a configurable value is divided into smaller blocks for more efficient communication across the network to the host systems and to reduce the impact on the network. Dividing the files into smaller blocks minimizes the amount of retransmission in case of a timeout. An example of such a configurable value is one megabyte.

A change list (manifest), including the file sizes of the changed files is sent to each agent that is to receive the content. The agent determines whether there is sufficient disk space for the update, based on the file sizes in the change list and the computation the agent knows it will need to perform. For example, the agent may determine whether there is enough room within the file system to store the compressed copy of the content updates, and two copies of the uncompressed data, a temporary copy and the copy to be stored. In this way, the agent is able to abort transfer before the host has become overloaded with the new content.

When a predetermined number of servers have agreed to receive the updated content, the data is sent from the content distributor to the agents. If too many agents are unable to receive the content, the content distributor may abort the job. The percentage of agents required for a transfer to take place is configurable. For example, the system operator may determine that the transfer should not take place unless 50% of the agents are able to accept the changes. It is possible in this way to prevent having too few servers that have the updated content.

In one embodiment, transfer occurs using a standard TCP/IP transport, such as file transfer protocol ("FTP"). In another embodiment, transfer occurs using a reliable multicast protocol. If there are transmission failures, a block of data is resent. If the transfer fails repeatedly, the transfer is aborted, and various action can be taken including alerting the system operator. Again, the content distributor may abort the installation of the changes if due, to unforeseen circumstances, fewer agents succeeded at the transfer than were expected to. If, for example, many of the agents lose network connectivity, it would be possible to have an insufficient number of agents available to serve the new content.

Referring again to FIG. 1, if an update fails for a particular agent 106, the web service system 90, will attempt to "route around" the affected part of the system. In an embodiment where the content distributor is separate from the manager, the content distributor 125 informs the manager 110 that the agent 106 has failed. The manager 110 communicates with the traffic manager 120, so that the traffic manager will not direct web page requests to the web servers 102 communicating with that agent 106. The manager 110 may also direct traffic away from the web servers 102 onto other servers.

In one embodiment, the content distributor 125 will create a "catch-up" update package targeted to the failed destination agent. The catch-up update package contains the changes that should have, but have not, reached the agent; initially, this is the list of changes from the first update to fail in transmission. This catch-up update package may grow if subsequent updates also fail to reach the same agent. When an update package fails, the agent will not receive other updates until a "catch-up" update completes, because there may be dependencies from new updates on changes which earlier failed to propagate.

Referring again to FIG. 3, once the changes have been transmitted to the agent 182, the changes are installed (STEP 183). The agent 106 and the web server interface 104 cooperate to install the content. When the new content has been received, the agents reassemble, and then uncompress, the update packages, and place the data in a temporary data store. The agents then wait for a signal from the content distributor to begin copying the files to the server content directories. When the signal is received, the changes are made to the server content directories. Also, any files listed for deletion are removed at this time. When the update is successful, the agents inform the content distributor that they have succeeded in updating the files. In one embodiment, the copying is accomplished with a simple overwrite. In another embodiment, the old files are first renamed and/or stored in an alternate directory. This allows the change to be quickly reversed, but with the tradeoff of requiring more data storage. If copying fails for any reason, the agents will alert the content distributor of the problem. Either the agent or the content distributor will also alert the Manager, which may then instruct the traffic manager to avoid the failed agent. In one embodiment, the agents maintain a version identifier, which indicates the content state of the web server. In one embodiment, the version identifier is an integer value.

In one embodiment, the web server is paused or stopped during the update process. When the files are copied to the web server content directories, the web servers are prevented from handing web page requests in order to prevent requesters from receiving inconsistent content. The web servers are coordinated to redirect users during the content update process. This is accomplished by the manager directing the traffic manager not to forward requests to that web server. At the same time, requests which do reach that web server 102 may be redirected by the web server interface 104 from that web server 102 to the traffic manager 120 or to another web server 102. Users in the middle of a transaction may be given a predetermined amount of time to complete the transaction before being redirected. Once the web server has been flushed of requesters, the update will take place. If application binary files are not being changed, the web server can be flushed of requesters, and then requesters can be directed to the server once the content transfer is complete. If application binary files are modified, however the web server may need to be restarted.

In some cases, it may not be possible to disable web servers in order to update content. The process of temporarily redirecting the browsers can be very time consuming, and that time, combined with the time required to transfer files and update the web server can be unacceptably large. To maximize server availability, the content can be updated while the web server continues to respond to requests. This is achieved by creating a copy of the files that will be changed, and putting the copy of those files in a place accessible to the web server. The agent directs the web server interface to intercept all requests for files that are changing. Requests for files that are not changing can be directed to the usual content area. Requests for files that are changing can instead be directed to the stable copy, while the new files are installed in the usual area. After the agent has completed modifications to the files, the web server interface can be signaled to again use the normal area. Users who, at the time of switchover from the old to the new content, are involved in a transaction that involves a series of related web pages may need to continue to access the "old" content for some time after the switchover, until the transaction is complete. For example, a user in the middle of a purchase at a first price should not complete the transaction with a web page that is using an updated, different price.

In one embodiment, to ensure transaction integrity, each changeover is assigned a version identifier. In one embodiment, the version identifier, also referred to as a checkpoint identifier, is an integer that changes by being incremented with each content update. The web server interface intercepts web page requests based on the version expected by the browser, and provides the content for that version. To do this, the web server needs to know the version that is desired by the browser. In one embodiment, this information is included in the URL. However, this has the disadvantage of making the URLs and file structure more complicated. Also, the version change is less transparent to the user.

In one embodiment, the web server issues a cookie to a browser that includes a version identifier that specifies the then-current version of the pages served by the server to that browser. A cookie is a special text file that a web server sends to a browser so that the web server can "remember" something about that browser. Using the Web's Hypertext Transfer Protocol (HTTP), each request for a Web page is independent of all other requests. For this reason, without a mechanism such as a cookie, the web server has no knowledge of what pages it has sent to a browser previously or anything about the browser's previous visits. A cookie is a mechanism that allows the server to store its own information about a browser on the browser's own computer, and access that information when the user makes a web page request. Cookies can be provided with an expiration duration, meaning that they will be discarded by the browser after a period of time.

In one embodiment, an example of such a cookie is implemented as the code: "Set-Cookie: AtreveBCD=37; expires=Thursday, 20Jan. 1999 12:32:34 GMT; path=/" This code is sent from the web server to the browser. The browser will, when communicating with web servers in the same domain, include the line "Cookie: AtreveBCD=37" for all requests to any path, until 12:32:34 GMT, on 20Jan. 1999. The "Set-Cookie" and "Cookie" parts of the protocol are headers according to the HTTP specification. The "AtreveBCD" is the name of the cookie. Any other name can be used; AtreveBCDis the default. The "37" is the value of the cookie, which is the checkpoint that the server has now, and will (because of the web server interface) continue to offer until the expiration time. The code "Expires" sets that expiration time. In the example, the expiration time is 20Jan. 1999. The "Path" code can be used to limit which pages give the cookie, but the "/" indicates it that it will cover all files.

The cookie that the web server issues to the browser effectively allows the browser to request content from the web server and indicate the version identifier for that content. Thus, if the browser makes six requests with a particular cookie specifying a particular URL, those six requests thus will be self-consistent, even if the agent has in the meantime delivered new version(s) of content to the web server 102.

In one embodiment, the earlier content is not discarded until all cookies that specify that content have been discarded. The content is stored in a "backup area" which contains the changes from a version to the next version. For example, the files that change in a transition from version 2 to version 3 will be stored in the version 2–3 backup area. The web server interface will direct web page requests for version 2 that changed in the transition from version 2 to version 3 to the appropriate content in the appropriate backup area.

Referring to FIG. 8, in a simplified example, a web server has content with a current version identifier of 34. Previous versions for which cookies are still valid are versions 33 and 32. The current version, version 34, contains files A and B, which were modified in version 34; file C, which was modified in version 28; and file D, which was modified in version 25. File A was modified in every version shown in the figure, including version 32, version 33, and version 34. File B was modified in version 30, version 32, and as stated above, in version 34. The change from version 31 to version 32 thus included changes to files A and B, and deletion of file E, which was created in version 1. Therefore, in the 31–32 backup area, which contains the files that changed in the transition from version 31 to version 32, is version 31 of file A, version 30 of file B, and version 1 of file E are stored. The change from version 32 to version 33 included modification of file A, so in the 32–33 backup area, version 32 of file A is stored. The change from version 33 to version 34 included modification of files A and B, and deletion of file F (which was added in version 10), so in the 33–34 backup area are stored version 33 of file A, version 32 of File B, and version 10 of file F.

If a web server requests content, for example by presenting a cookie that indicates a content version other than the current version, and if that file was changed between that older checkpoint and the current one, the web server interface may direct the web server to take the content from an area other than the current version area. In one embodiment, the web server interface reviews the change lists to determine if the requested file has changed, and if it has changed, what backup area it is located in. For example, still referring to the example of FIG. 8 in which the current version is version 34, if the web server receives a request for file A, and the cookie indicates that the browser is looking for version 32, the web server interface will see that file A was modified as part of version 33. Version 32 of file A therefore is located in the 32–33 backup location. If the web server receives a request for file B from the same browser (with the same version 32 cookie), the web server interface will determine that file B changed for version 34, and so version 32 of file B is stored in the 33–34 backup area. If the web server receives a request for file D, the web server interface will determine that the file has not been modified since version 32, and that file can be obtained from the current version area.

In one embodiment, the content distributor provides for scheduled updates of source file set changes to a particular time or time interval. The content distributor can also update upon a manual command of the system operator. In one embodiment, the update is specified by: a content mapping indicating where files should be copied from (i.e. the source file set) and where they should be copied to (i.e. the file servers' file systems); a start/date time or time interval indicating when the update should take place; whether only the changed files should be updated (as described above) or whether all files should be copied; the action that should be taken upon a failure; whether the server should be restarted upon content update; whether the server should be paused or stopped during the content update; whether the update is enabled or disabled (to allow the system operator to disable a scheduled update); and the percentage of servers that need to accept the update before the servers will be instructed to make the change. In one embodiment, the update is referred to as a job.

For example, it is possible to specify an update that runs every ten minutes, updates the files that have changed, and notifies a system operator of any problems. It is also possible to specify an update once a month. In one embodiment, the system turns off the servers while copying the files, updates all the changed files and restarts the servers when the content has been updated.

Figure 9:
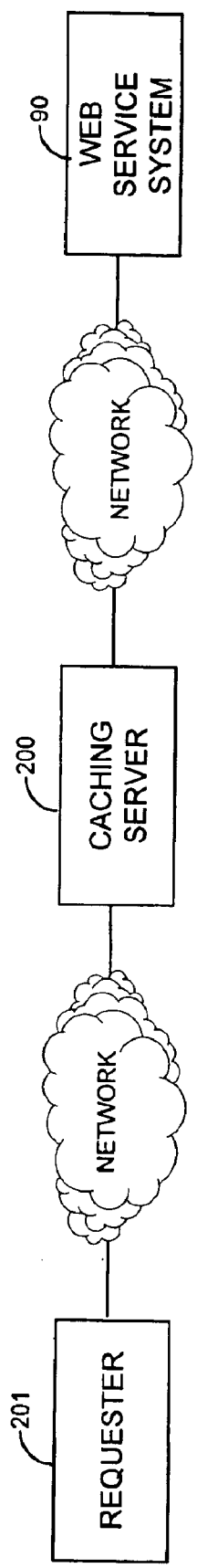
FIG. 9 is a block diagram of an embodiment of a web service system in communication with a caching server.

Referring to FIG. 9, some web service systems 90 have one or more associated caching servers 200. A caching server 200 is a type of web server that is located between the requester 201 (for example, a browser) and the web service system 90. The caching server 200 initially does not have any content. Rather, it requests web pages upon demand from the requester 201 and stores the web pages in its cache. One example of a commercially available caching server is the NETCACHE product available from Network Appliance, Inc. of Santa Clara, Calif. The caching server 200 receives a web page request from a browser 201 for content located in web service system 90. Based on the request and its own configuration, the caching server 200 requests the web page from the original web server (web service system 90) that has the web page. The caching server 200 receives the web page from the original web server 90, and transmits the web page to the browser 201. The caching server 200 also stores that web page for a predetermined period of time. The period of time for which the page is stored is a time period determined by either the content provider (the original web service system 90) by, for example, specifying an expiration period with the delivery of the document according to the HTTP protocol, or by the caching server 200 system administrator. If a second request, from the same requester 201 or a different requester, arrives at the caching server 200 for that web page within the expiration period, the caching server can retransmit the web page in response to the request without making requesting the content from the original server. Thus, the request is fulfilled without placing further demands on the original server or the network with the second request.

When files change on the web service system 90, as described above, files cached on the caching server 200 may not have expired. In that case, the caching server 200 continues to provide an earlier version of a web page than the updated version that is available from the web service system 90. It is therefore useful to use change lists, such as those described above, to notify a caching server 200 that files have changed.

Referring to FIG. 10, in a system in which file changes are coordinated with a caching server 200, changes are made to files (STEP 180), changes are identified (STEP 181), changes are transmitted (STEP 182) to the web servers, and changes are installed (STEP 183). A caching server is also notified (STEP 184) of the changes. The additional step of notifying the caching server (STEP 184) allows the caching server to disregard (i.e. flush) the obsolete web page. There can be one caching server, or many caching servers, and they can be notified using various communication techniques. For example, in one embodiment, a broadcast message is used. In another embodiment a separate message is transmitted to each caching server. In yet another embodiment, a file is stored in a directory available to one or more caching servers.

Referring to FIG. 11, an embodiment of the method of FIG. 6 can include making the changes (STEP 180) identifying the changes (STEP 181), and notifying the cache (STEP 184). In one embodiment, the notification (STEP 184) includes converting the change list to Uniform Resource Locators ("URL") to identify content (STEP 186). Browsers use URLs to identify content. As described above, in one embodiment, the change lists are described in terms of directories and files in the host file system, because this is more convenient for Web Servers and allows indication of all files in the most file system. When providing changes to a caching server, it is useful to convert the change list that lists files (and directories) into a format that includes the URL. It is possible that a source directory corresponds to a particular prefix of possible URLs. For example, the content directory and file "C:\WEBSPECTIVE\HOME\ABOUT.HTML" might correspond to the URL "http://www.webspective.com/home/about.html". This implies that the prefix would have to be modified (in this case C:\WEBSPECTIVE replaced with http://www.webspective.com), and the directory separator, in this case the backslash "\" replaced with the URL standard forward slash "/". In addition, characters which are not allowed in URLs, such as spaces, are encoded according to a specified rule. An example of such character replacement is described in the IETF Network Working Group RFC-1783 document entitled "Uniform Resource Locators" by T. Berners-Lee et al. For example, spaces can be encoded with "%20", and this translation concatenated onto the URL prefix.

Once the list items have been converted into URL format, the list of altered URLs is sent to the caching server (STEP 187). The caching server can use this list to discard outdated content. As shown in FIG. 7, it is not necessary to perform content propagation to perform the notification. For example, even if there is only one web server, but many caches, the system of FIG. 7 will serve to notify one or more caching servers of the changes. As shown in FIG. 7, the changes are made (STEP 180), the changes are identified (STEP 181), and the list of changes are then converted to URLs (STEP 186). Those changes are transmitted to the caching server (STEP 187). In another embodiment, the conversion to URLs (STEP 186) takes place between the time that the changes are made (STEP 180) and the change identification step (STEP 181).

Referring to FIG. 12, in one embodiment, method of FIG. 3 and FIG. 10 further includes running a user configurable script. After changes are made (STEP 180), the user configurable script is run (STEP 280). After changes are identified (STEP 181), the user configurable script is run (STEP 281). The script runs simultaneously with the transmission of the changes (STEP 182). After changes are transmitted (STEP 182), the user configurable script is run again (STEP 282). The user configurable script can be used to accomplish content distribution tasks that are specific to a customer's implementation. The user configurable script is run through the appropriate call to an operating system function.

Referring to FIG. 13, in one embodiment, information is provided to the callout script. In one embodiment, the information is provided to the script on the standard input. In another embodiment, the information is provided in a file. The script returns either a successful (zero) status code, or a non-zero error code, which in one embodiment will abort the operation.

In one embodiment, the information 400 is provided in a text format, beginning with a BEGINPARAMS statement 401, and ending with an ENDPARAMS statement 420. The information 400 includes the version number 402 of the information block, which is used for compatibility. The information 400 includes the name of the job 403, which in this example is EXAMPLEJOB.

The information 400 includes the state of the job 404, which can be one of BEGIN, IN PROGRESS, and END. A BEGIN value indicates that the script is called before the changes are identified (i.e. STEP 280 of FIG. 11). An IN PROGRESS value indicates that the script is called after the changes are identified, but before (or as) the changes are transmitted (i.e. STEP 281 of FIG. 11). An END value indicates that the transmission is complete (i.e. STEP 282 of FIG. 11). The information 400 includes the name of the mapping 405, which in this case is ALLIMAGES. The information 400 includes the path name of the manifest file 406, which in this example is /TMP/STAGING/23423.TXT. In the example, the manifest is a text file, which implies that it is in the text embodiment described above. In one embodiment, the manifest is stored in the binary embodiment, as is converted to a text file before the script is called.

The information 400 includes the source file set directory 406, and a revert directory 408, which can hold an earlier version of files (before changes), or can contain any content that should be automatically reverted to. An array of destinations 409 is indicated. Each array element includes information about a destination for the files. In this example, there are two destination hosts, OOLONG and DARJEELING. The first element of the array begins with a BEGINELEMENT statement 410 and ends with an ENDELEMENT statement 414. The array element includes the name 411 of the destination host, which in this case is OOLONG. The array element includes the destination directory 412 on the destination host, which in this example is /HOME/HTTPD-OOLONG/DOC/IMAGES. The array element includes the state of the transfer 413, which in this example is NORMAL. The second element of the array begins with a BEGINELEMENT statement 415 and ends with an ENDELEMENT statement 419. The second array element includes the name 416 of the destination host, which in this case is DARJEELING. The array element includes the destination directory 417 on the destination host, which in this example is /HOME/HTTPD-DARJEELING/DOC/IMAGES. The second array element includes the state of the transfer 418, which in this example is NORMAL. Thus the information provided to the user script allows the same script to be called at different times during the execution of a job, and the script can take different actions depending on the parameters provided.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for replicating changes in a master source file set on a destination file system located on one or more hosts, the destination file system for access by a respective web server in each of the hosts, the method comprising the steps of:
   (a) identifying changes in the master source file set on a master computer;
   (b) storing the identified changes in a modification list;
   (c) transmitting the modification list to a respective agent at each respective host in communication with a respective one of the web servers running in the same host, thereby notifying each of the web servers that the master source file set has changed, the agents having access to the destination file systems at the corresponding hosts;
   (d) waiting until a predetermined non-zero number or percentage of the agents determine that their respective web servers are able to receive the identified changes before transmitting the identified changes to the agents;
   (e) transmitting the identified changes to the agents corresponding to the web servers that are able to receive the identified changes for completion of installation at those web servers, regardless of whether another one of the web servers is unable to complete installation of the identified changes; and
   (f) receiving a response from at least one of the agents after step (d) indicating that the destination file system installed the identified changes.

2. The method of claim 1 further comprising the step of:
   (f) transmitting a copy of a changed file of the master source file set to the agent.

3. The method of claim 1 wherein the identifying step compiises the steps of:
   inspecting a current version of the master source file set; and
   comparing the current version to a previous version of the master source file set on the master computer.

4. The method of claim 3 wherein the comparing step comprises comparing a file attribute of a file of the current version of the master source file set to a file attribute of a file of the previous version of the master source file set.

5. The method of claim 4 wherein the file attribute comprises at least one attribute chose from the group consisting of file size, file permissions, file ownership, modification time, and a hash of the file.

6. The method of claim 4 wherein the file attribute is stored in a list of file attributes.

7. The method of claim 1 wherein the identifying step comprises the steps of:
   installing a device driver to perform file operations and monitor changes to the master source file set; and
   recording, by the device driver, changes to the master source file set.

8. The method of claim 1 wherein the identifying step comprises:
   receiving a manifest describing changes to the master source file set.

9. The method of claim 1, further comprising, before the identifying step, the step of calling a script of user configurable instructions by calling an operating system function.

10. The method of claim 1, further comprising, before the transmitting step, the step of calling a script of user configurable instructions by calling an operation system function.

11. The method of claim 1, further comprising, after the transmitting step, the step of calling a script of user configurable instructions by calling an operating system function.

12. The method of claim 11, further comprising the step of determining whether the transmitting step has successfully completed, and wherein the calling step occurs after the determining step.

13. The method of claim 11, wherein the step of calling a script occurs after the success of the transmission is known.

14. The method of claim 1 wherein the transmitting step comprises multicasting.

15. The method of claim 1, further comprising transmitting a signal to the agent separate from the modification list, the signal indicating that the agent is permitted to install the changes in the at least one web server.

16. A web service system, comprising:
   a manager for managing the web service system;
   one or more hosts, each comprising a web server for receiving web page requests and an agent in communication with the manager and the web server; and
   a content distributor in communication with the hosts and the manager, the content distributor providing notification of changes to a master source file set on a master computer to the hosts, the content distributor waiting until a predetermined non-zero number or percentage of the agents determine that their respective web servers are able to receive the identified changes before transmitting the identified changes to the agents, and then transmitting the identified changes to the agents corresponding to the web servers that are able to receive the identified changes for completion of installation at those web servers regardless of whether another one of the web servers is unable to complete installation of the identified changes, the content distributor receiving a response indicating that the identified changes are installed.

17. The system of claim 16, further comprising a traffic manager in communication with the manager, the traffic manager directing web page requests to the web server.

18. The system of claim 16, wherein the content distributor comprises:
   (a) an identification module for identifying changes in the master source file set on a master computer;
   (b) a modification list for storing identified changes to the master source file set;
   (c) a transmitter for transmitting the modification list to the agent, the agent having access to a destination file system; and
   (d) a receiver for receiving a response indicating that the destination file system received the identified changes.

19. The system of claim 18, further comprising a transmitter for transmitting a copy of a changed file of the master source file set to the agent.

20. The system of claim 18, wherein the agent comprises an installer for installing a copy of a changed file of the master source file set on the destination file system.

21. A content distributor in communication with a computer, comprising:
   (a) an identification module for identifying changes in a master source file set on a master computer;
   (b) a modification list for storing identified changes to the master source file set;
   (c) a transmitter for transmitting the modification list to one or more agents in communication with the computer, the agents having access to a destination file system, the transmitter waiting until a predetermined non-zero number or percentage of the agents determine that their respective web servers are able to receive the identified changes before transmitting the identified changes to the agents and then transmitting the identified changes to the agents corresponding to the web servers that are able to receive the identified changes for completion of installation at those web servers, regardless of whether another one of the web servers is unable to complete installation of the identified changes; and
   (d) a receiver for receiving a response from the computer after the modification list is transmitted, the response indicating that the destination file system received the identified changes.

22. The content distributor of claim 21, wherein the transmitter is also for transmitting a copy of a changed file of the master source file set to the agent for installation on the destination file system.

23. A method for replicating changes in a master source file set on destination file systems located on respective hosts, the destination file systems for access by respective ones of a plurality of web servers, the method comprising the steps of:
   (a) identifying changes in the master source file set on a master computer;
   (b) storing the identified changes in a modification list;
   (c) transmitting the modification list to respective agents in communication with respective ones of the web servers, the agents having access to the respective destination file systems, each one of the destination file systems with its respective agent and web server running on the same respective host, thereby notifying the respective web servers that the master source file set has changed;
   (d) waiting for a predetermined number or percentage of the web servers to be able to receive the updated content;
   (e) if a predetermined non-zero number or percentage of the web servers are able to receive the updated content, then:
      (1) transmitting the changes to the agents corresponding to the web servers that are able to receive the identified changes for completion of installation at those web servers, regardless of whether another one of the web servers is unable to complete installation of the identified changes; and
      (2) receiving a response from at least one web server indicating that the identified changes are installed at the respective destination file system of that agent; and
   (f) aborting transmission of the changes to the agents if fewer than the predetermined number or percentage of the web servers are able to receive the updated content.

24. The method of claim 23, further comprising aborting installation of the changes if an insufficient number of agents are available to serve new content.

25. The method of claim 23, further comprising transmitting a signal to the agents separate from the modification list, the signal indicating that the agents are permitted to install the changes in the respective web servers.

* * * * *